United States Patent [19]

Kuwana et al.

[11] 3,758,166
[45] Sept. 11, 1973

[54] PROCESS AND APPARATUS FOR ANTISKID CONTROL MECHANISM

[75] Inventors: Kazutaka Kuwana, Kariya; Hayao Yamazaki; Takefumi Sato, both of Osaka, all of Japan

[73] Assignees: Aisin Seiki Kabushiki Kaisha, Kariya City; Sharp Corporation, Osaka, Japan

[22] Filed: Oct. 19, 1970

[21] Appl. No.: 82,040

[52] U.S. Cl. .............. 303/21 P, 303/20, 303/21 BE
[51] Int. Cl. .............................................. B60t 8/10
[58] Field of Search ..................... 188/181; 303/20, 303/21; 317/5; 318/52; 324/160–162; 340/262–263

[56] References Cited
UNITED STATES PATENTS

| 3,609,313 | 9/1971 | Lucien | 303/21 BE X |
| 3,671,083 | 6/1972 | Matsumura | 303/21 BE |
| 3,672,730 | 6/1972 | Burckhardt et al. | 303/21 BE |
| 3,275,384 | 9/1966 | Hirzel | 303/21 EB |
| 3,394,967 | 7/1968 | Lucien | 303/21 BE |
| 3,467,443 | 9/1968 | Okamoto et al. | 303/21 BE |
| 3,498,682 | 3/1970 | Mueller et al. | 303/21 BE |
| 3,583,773 | 6/1971 | Steinbrenner et al. | 303/21 EB |
| 3,586,386 | 6/1971 | Riordan et al. | 303/21 BE UX |

FOREIGN PATENTS OR APPLICATIONS

| 1,810,163 | 7/1970 | Germany | 303/21 BE |
| 1,953,253 | 6/1970 | Germany | 303/21 P |

Primary Examiner—Milton Buchler
Assistant Examiner—Stephen G. Kunin
Attorney—Sughrue, Rothwell, Mion, Zinn & Macpeak

[57] ABSTRACT

This invention presents an improved method and apparatus for an antiskid brake control which provides the shortest possible brake application period and maximum adhesive force between the vehicle tires and the road surface under all conditions by utilizing an electronic circuit into which input signals representing vehicle speed, wheel speed and hydraulic brake apply pressure are fed. The electronics control circuit computes the rate of vehicle deceleration and the ratio of the wheel speed to the vehicle speed and compares this ratio with a constant value. An output signal from the electronic circuit is used to control an electric solenoid valve in the hydraulic brake circuit to modulate the hydraulic pressure and obtain an optimum vehicle braking effort under all conditions and prevent a vehicle skid condition from arising.

25 Claims, 41 Drawing Figures

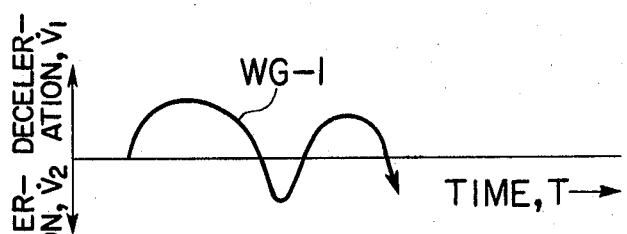
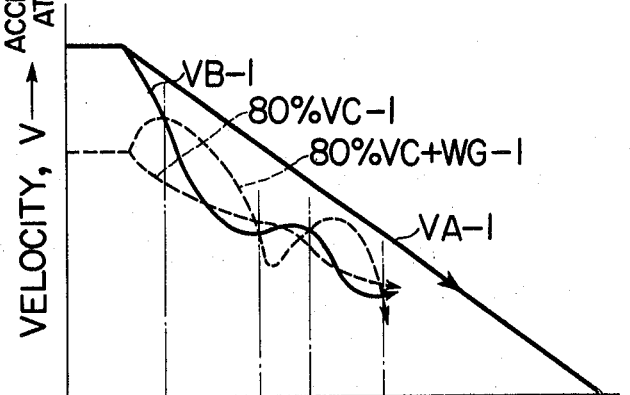
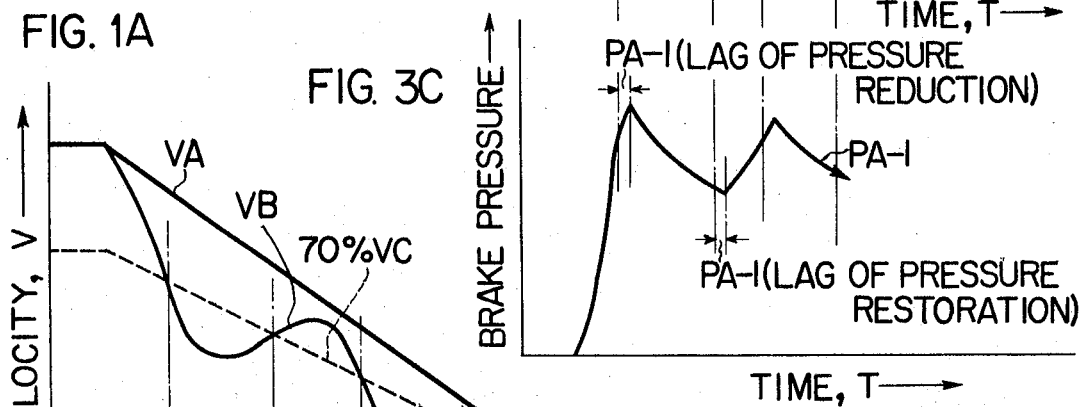

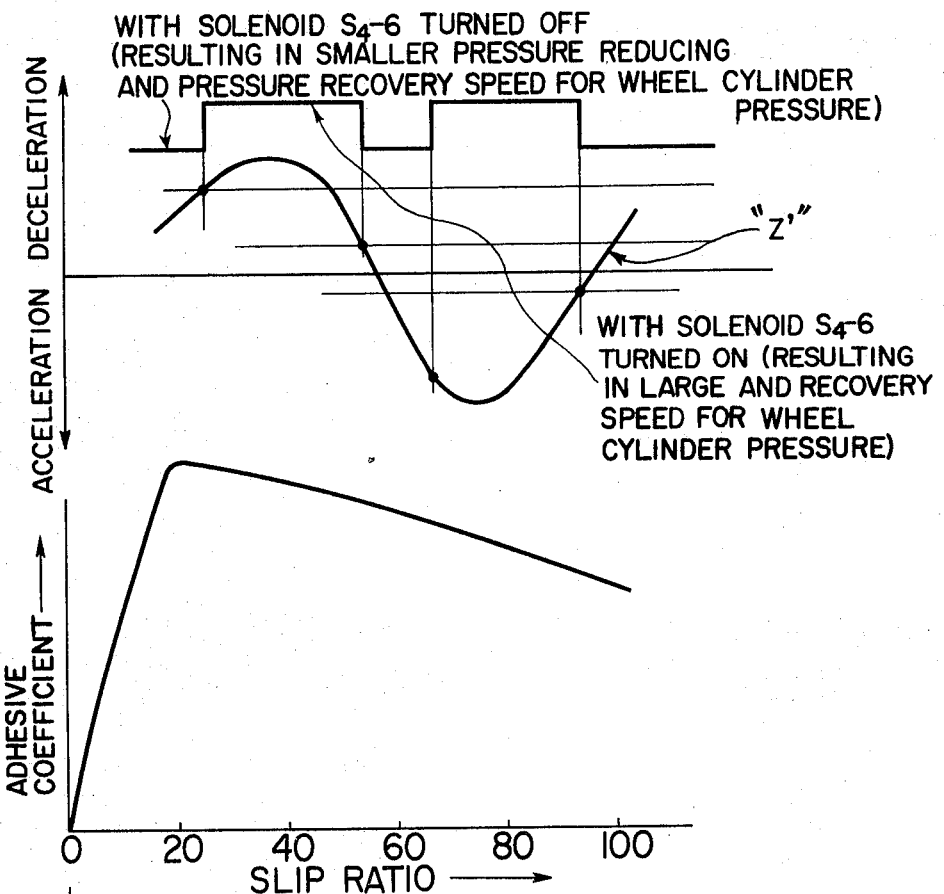
FIG. 18
FIG. 7
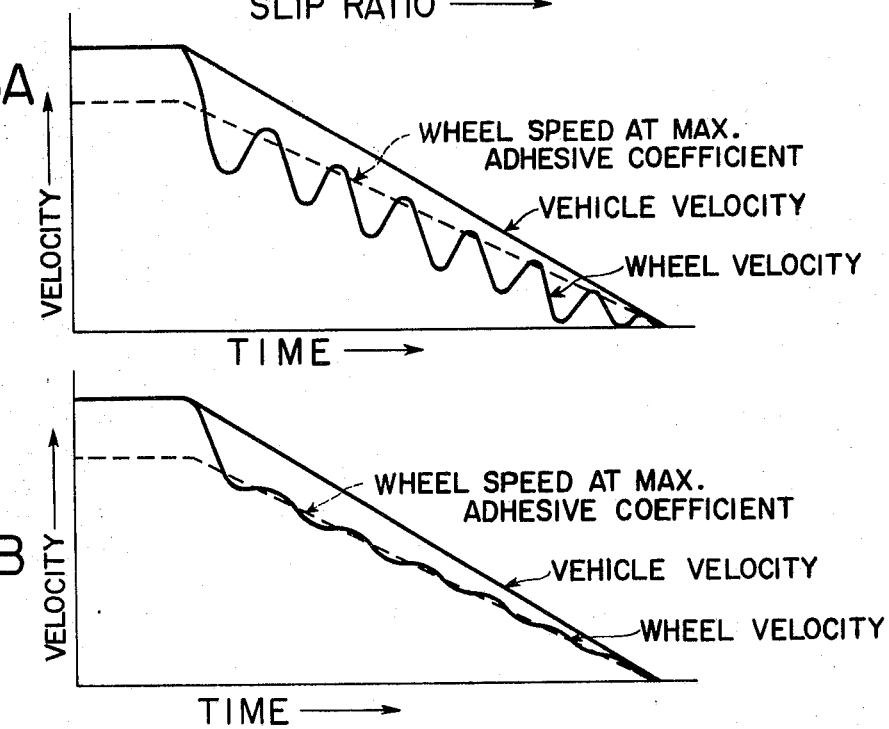
FIG. 8A
FIG. 8B

FIG. 16
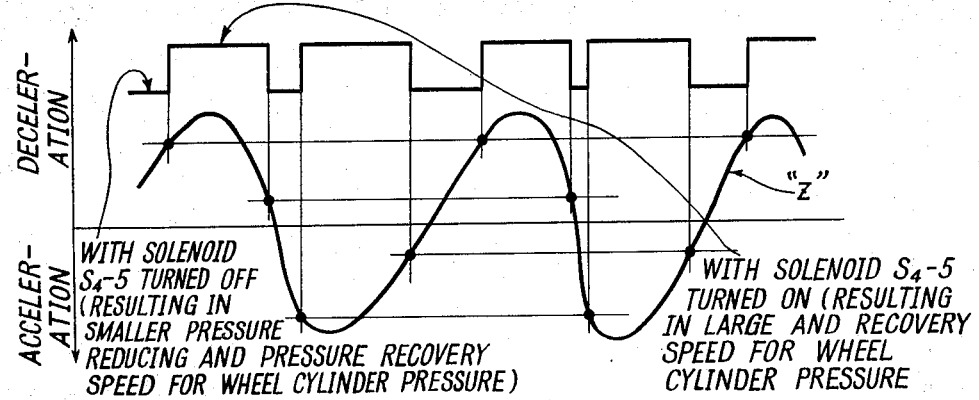
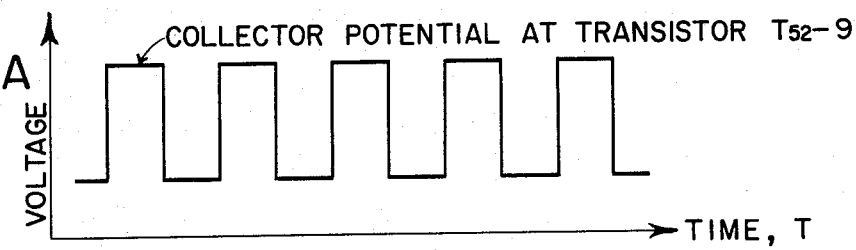
FIG. 26A
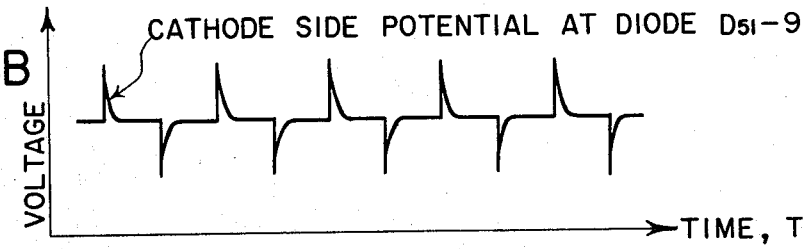
FIG. 26B
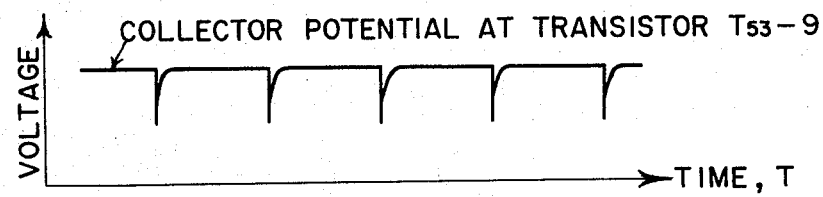
FIG. 26C
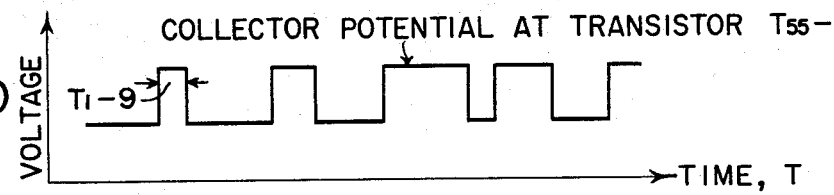
FIG. 26D
FIG. 26E

PROCESS AND APPARATUS FOR ANTISKID CONTROL MECHANISM

This invention relates to improvements in and relating to antiskid brake control method for use with powered and wheeled vehicles, especially automotive vehicles, and an apparatus for realization of the same.

The main purpose of the invention is to provide a substantially improved process and apparatus, capable of providing a shortest possible brake application period for the realization of a certain desired degree of vehicle braking effect such as stoppage of a running vehicle, under utilization, as far as possible, of the maximum adhesive force acting between the wheel tire and the traffic surface on which the vehicle is travelling.

A further object is to provide a method and apparatus of the kind above referred to, capable of maintaining the inevitable fluctuation of the vehicle deceleration rate during a brake application period.

These and further objects, features and advantages of the invention will become more apparent when reading the following detailed description of the invention in comparison with the comparative prior art.

In the drawings:

FIGS. 1A–1B are a combined chart showing a V-T diagram illustrative of the mutual relationship among the wheel speed VA, wheel peripheral speed VB and 70 percent-pseudo vehicle speed VC, and a corresponding P-T diagram showing the brake pressure PA plotted against time, the both being as conventionally and frequently met with use of a conventional antiskid brake pressure control unit.

FIGS. 3A–3C are a combined and illustrative chart for clarifying the operation of the pressure control circuit arrangement shown in FIG. 2.

FIG. 7 is a chart which the general tendency of the adhesive coefficient *mu* acting between the traffic surface on which an automotive vehicle is running and the wheel tyre thereof, said coefficient being plotted against the slip ratio S.

FIGS. 8A–8B are a combined and comparative chart illustrative of the performance curves for the conventional and the inventive brake pressure controller, respectively.

FIG. 16 is a chart showing the performance of the comparator II-5 employed in the fifth embodiment shown in FIG. 10.

FIG. 18 is a chart illustrative of the performance curve of the comparator II-6 employed in the sixth embodiment of the circuit arrangement shown in FIG. 11.

FIGS. 26A–26E are illustrative of several voltage curves appearing in the foregoing nineth embodiment shown in FIG. 25.

Figure 2:
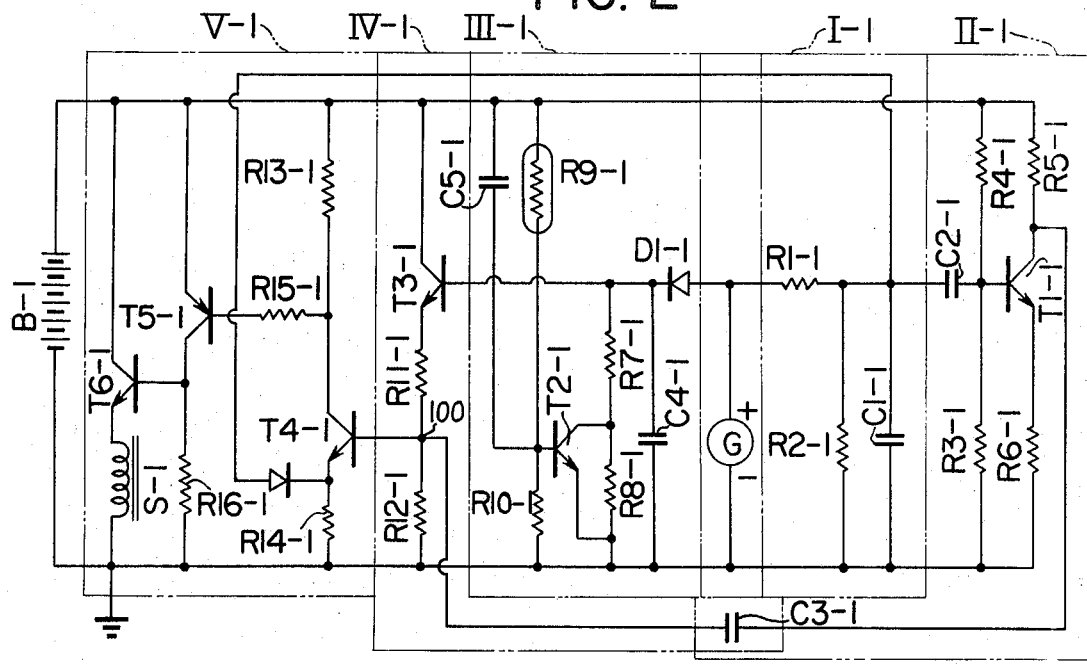
FIG. 2 is a wiring diagram of a first embodiment of the pressure control circuit arrangement constituting the main constituent of the brake pressure control unit adapted for carrying out the process according to this invention.

Before entering into the detailed description of several preferred embodiments of the invention, a brief description of the working principles of the conventional comparative process will be given.

All numerical data such as 70 percent-psuedo vehicle speed, 80 percent (page 12), slip ratio 20 percent, as used throughout the specification are only representative values and thus may be subject to an allowance of plus or minus several percent in each case.

In FIG. 1A, VC-curve represents a 70 percent pseudo-vehicle speed which has been artificially produced from the vehicle deceleration, the brake pressure PA or the like known parameter. When the wheel speed should drop beyond this 70 percent-pseudo-vehicle speed, the brake pressure is subjected to a reduction intentionally. On the contrary, when the wheel speed should exceed above said pseudo-vehicle speed, the brake pressure is intentionally increased. When the wheel speed drops again beyond the pseudo-vehicle speed by virtue of the said intentional increase of the brake pressure, the brake pressure will be again reduced intentionally, and so on. By this repeated brake pressure increasing and decreasing steps, the brake application is performed, so to speak, in a wavy manner.

For carrying out the antiskid braking system, a wavy brake pressure application performance curve is realized which will fluctuate as at VB in FIG. 1 at (A) along the 70 percent-pseudo-vehicle speed curve VC. The wheel speed is naturally subjected to an overall reduction in its value during the whole progress of the brake application, until finally the vehicle is brought into its dead stop condition.

According to this control method belonging to the prior art, the reduction of the brake pressure is intended to initiate when the wheel speed drops beyond the said 70 percent-pseudo-vehicle speed.

In this case, however, the practical initiation of the brake pressure reduction is performed practically upon lapse of a time lag normally amounting to 0.02 second.

In order to re-increase the once reduced wheel speed, the brake pressure must be reduced to a certain degree and such a phenomenon will generally observed that even upon reduction of wheel speed beyond the 70 percent-pseudo vehicle speed, the wheel speed will continue to decelerate. As an example, the braked wheel speed may frequently drop beyond the said pseudo-value by a substantial value such as, for instance, 10–30 km/hr.

On the contrary, a brake pressure re-increase is intended to initiate only upon realization of a higher wheel speed over said 70 percent-pseudo-vehicle speed. In this case, also, a similar kind and amount of time lag amounting to about 0.02 second generally exists. The wheel speed will generally exceeds 5 km/hr above the said pseudo-value.

According to our practical experiments, a higher vehicle speed will provide only a comparatively low degree of fluctuation in the slip ratio, but, in the case of medium and low wheel speeds, the variation of slip ratio will generally be apparent and substantial, resulting in a frequently encountered wheel lock or even non-effectiveness of the brake application.

Necessary braking period and the passanger's drive feeling are naturally become unfavorable so far.

It is a practical and more specific object to provide a process and an apparatus for control of the brake pressure in the antiskid type braking system wherein the wheel speed is conditioned to lie within such allowance of ±2-3 km/hr around the 80 percent-pseudo-vehicle speed.

According to this invention, the wheel speed during brake application is practically confined within such a range between 20% slip ratio and +2-3 km/hr/vehicle speed.

In this way, a maximum possible adhesive force is realized between the vehicle travelling surface and the wheel tyre surface.

Next, referring to FIG. 2, the first embodiment of the circuit arrangement embodying the main principle of the invention and adapted for the control of an automotive hydraulic brake system will be described hereinafter in detail.

In FIG. 2, the shown circuit arrangement comprises a wheel speed sensing circuit I-1 which includes a d.c. generator G-1 fixedly attached to the shaft of an automotive vehicle wheel, not shown in the drawing for simplicity, for sensing occasional travelling speed of the vehicle to be braked under the control of the method and apparatus according to the invention.

This generator G-1 naturally develops a voltage output corresponding to the rotational speed of the vehicle wheel.

The positive pole of the generator is connected through a resistor R1-1 to a condenser C2-1, as shown, while the negative pole of the generator is connected to one side of a condenser C1-1, a resistor R2-1 being connected across the generator and in paralled to said condenser C1-1.

As commonly known to those skilled in the art, the aforementioned condenser will serve to smooth out unavoidable ripples appearing in the voltage output from the generator G-1, so as to provide a smoothening effect to the generator output.

The circuit arrangement shown in FIG. 2 comprises further a wheel deceleration sensor II-1 which includes a condenser C2-1 earthed through a resistor R3-1 while the opposite side of condenser C2-1 is connected electrically through a resistor R4-1 to the positive side of a battery B-1 and at the same time to the base electrode of a transistor T1-1. The related circuit part constitutes a differential circuit part, serving to differentiate the smoothed output voltage from the generator G-1, so as to deliver through resistors R3-1 and R4-1 to provide a proper bias voltage to the base electrode of the transistor T1-1 for keeping a base potential thereat.

The collector electrode of transistor T1-1 is connected through a resistor R5-1 to the positive pole of the battery B-1 and at the same time directly with a coupling condenser C3. The emitter of the transistor T1-1 is earthed through a resistor R6-1. The provision of transistor T1-1, resistors R5-1 and R6-1 serves for phase-conversion of the base potential of transistor T1-1 as well as for amplifying the same.

The amplified voltage is conveyed through the coupling condenser C3-1 in the form of a modified voltage as the wheel deceleration or acceleration voltage to the base of a transistor T4-1 comprised in a comparator V-1 to be described hereinafter.

The circuit arrangement shown in FIG. 2 further comprises as pseudo-vehicle setter III-1 comprising a diode, the anode of which is connected with the positive pole of the generator G-1, while the cathode side of the diode is connected to the base of a transistor T3-1 and at the same time earthed once through a condenser C4-1, and secondly through a series connection of resistors R7-1 and R8-1, a transistor T2-1 being connected across the latter resistor R8-1.

The emitter electrode of transistor T2-1 is earthed, while the base of the latter is connected through a paralled combination of pressure-responsive resistor R9-1 and condenser. C5-1 to the positive pole of the battery B. Although not shown, the resistor R9-1 is arranged to be subjected to hydraulic brake pressure, for instance, by being immersed in the hydraulic brake pressure pipe line, not shown, and electrically connected as shown. The base of transistor T2-1 is earthed through resistor R10-1.

As may be easily supposed, the condenser C4-1 accumulates the output from the generator G-1 and is adapted for discharge of the same through resistor R7-1, the equivalent resistance of transistor T2-1 and resistor R8-1.

With application of heavier brake, the resistance appearing at the resistor R9-1 will become correspondingly smaller, and vice versa. This nature of such pressure responsive resistor is highly known to those skilled in the art. Condenser C5-1 will serve for smoothing the effect of the variable resistor R9-1.

Figure 4:
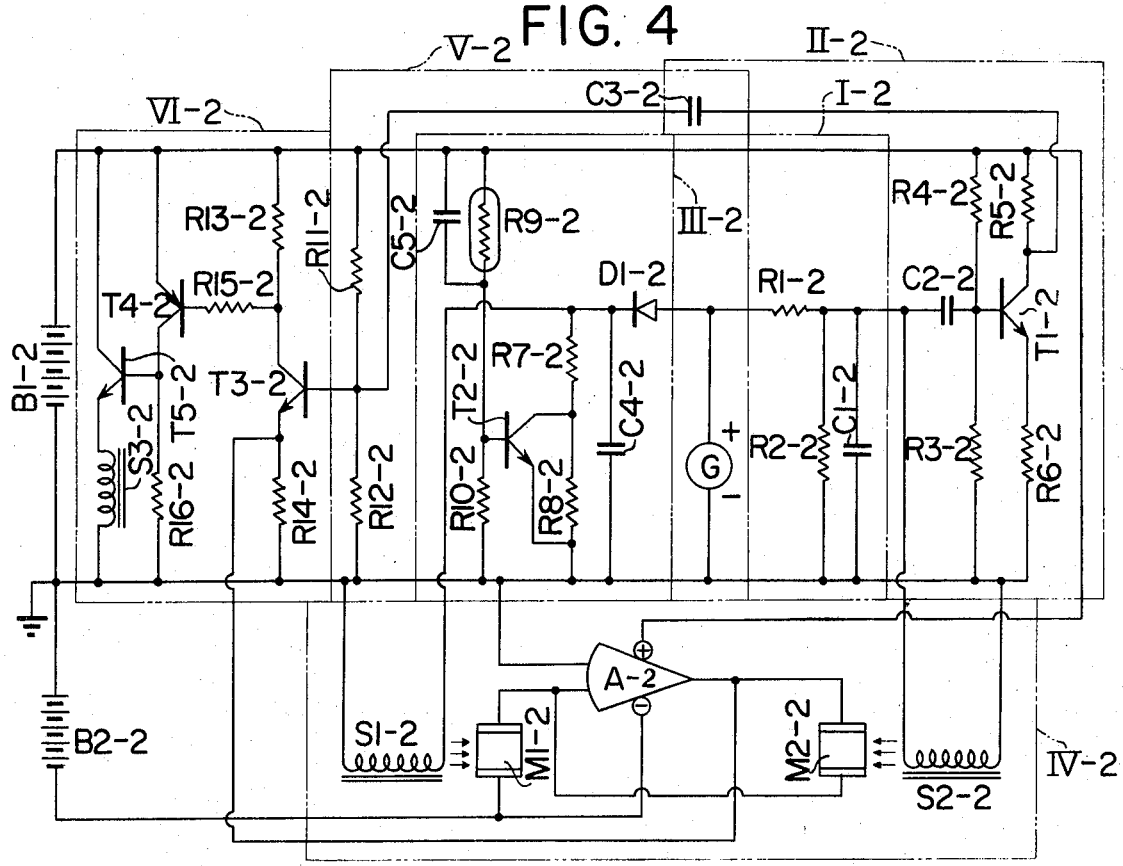
FIG. 4 is a similar view to FIG. 2, illustrating, however, a second embodiment of the brake pressure control circuit arrangement.
Figure 5A:
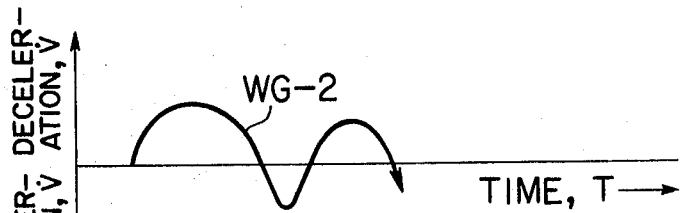
FIGS. 5A–5D are a combined and illustrative chart for clarifying the operation of the said second embodiment.
Figure 5B:
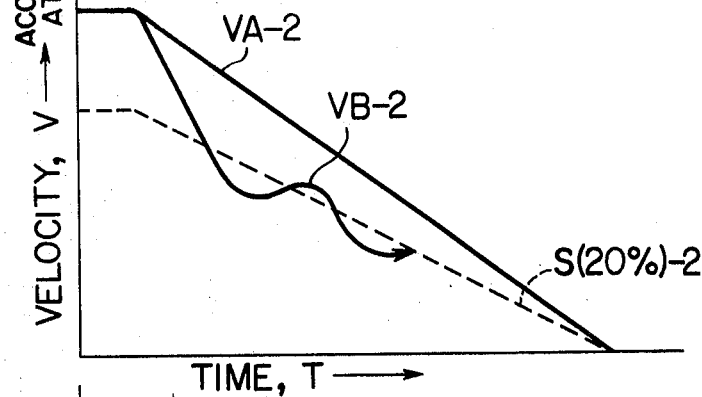
Figure 5C:
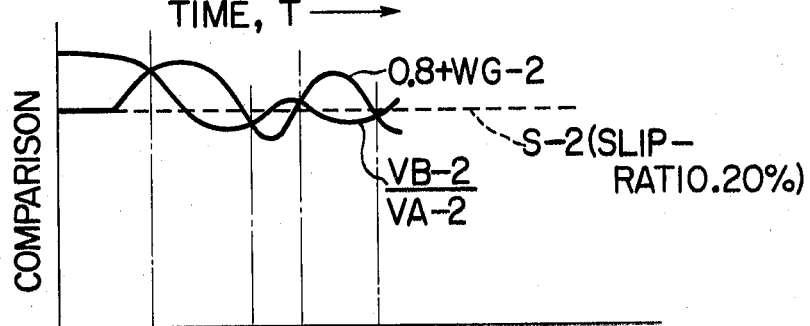
Figure 5D:
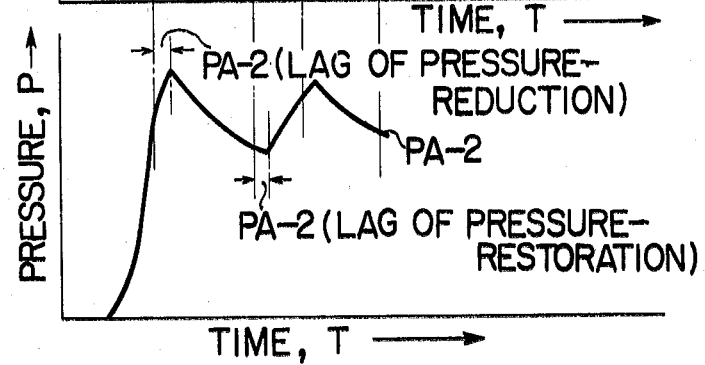

The circuit arrangement shown in FIG. 4 comprises further a reference setter IV-1 including a transistor T3-1, the collector of which is electrically connected to the positive side of the battery B-1, while the emitter of the sauce transistor is earthed through resistor R11-1, junction 100 and a further resistor R12-1, said junction being connected, on the one hand, with said coupling condenser C3-1, and with the base of a transistor T4-1 which is included in a comparator V-1 to be described.

Transistor T3-1 serves for current amplifying the base potential, the amplified output being divided in its voltage through resistor R11-1 and R12-1 to 80 percent of the emitter potential at transistor T3-1, so as to provide a corresponding base potential at the transistor T4-1.

On the other hand, the variation of collector potential at the transistor T1-1 is conveyed through condenser C3-1 to the base electrode of transistor T4-1 to be overlapped with the base potential at T4-1. Thus, it will be seen that the base potential at T4-1 is the sum of 80 percent of the base potential at T3-1 and the voltage conveyed through the condenser C3-1.

The circuit arrangement shown in FIG. 2 comprises, as referred to above, the transistor T4-1, the collector of which is connected through a resistor R13-1 to the positive pole of battery B-1, and at the same time, through a resistor R15-1 to the base of a transistor T5-1. The emitter of transistor T4-1 is earthed through a resistor R14-1, and connected at the same time with the negative pole of the generator G-1.

The collector of transistor T5-1 is connected to the positive pole of battery B-1, while the emitter of the same transistor is earthed through a resistor R16-1 and connected at the same time directly to the base of a transistor T6-1.

The collector of transistor T6-1 is connected directly to the positive pole of battery B-1, while the emitter of the same transistor is earthed through a solenoid S-1. Although not shown, the solenoid S-1 is so designed and arranged, as known per se, to reduce the brake applying pressure, when the solenoid is brought into its energized state, and to restore the braking pressure when the solenoid is kept in its de-energized state. When the base voltage at the transistor T4-1 is larger than the emitter voltage at the same transistor, the transistor T5-1 as well as the transistor T6-1 will become conductive, so as to provide a current to solenoid S-1. On the other hand, when the base voltage of transistor T4-1 is smaller than the emitter voltage of transistor T4-1, transistors T4-1 and T5-1 will become non-conductive, and transistor T6-1 become also non-conductive, so as to interrupt current flow through said solenoid S-1.

The positive pole of battery B-1 is connected to resistor R4-1, R5-1, pressure-responsive resistor R9-1, resistor R13-1, condenser C5-1, collectors of transistors T3-1 and T6-1 and emitter of transistor T5-1, respectively. On the other hand, the negative pole of battery B-1 is connected to respective resistors R2-1, R3-1, R6-1, R8-1, R10-1, R12-1, R14-1 and R16-1, solenoid S-1, condensers C1-1 and C4-1, the negative pole of generator G-1 and the emitter of transistor T2-1, and earth as shown.

The operation of the first embodiment of the circuit arrangement shown in FIG. 2 is as follows. Under normal travelling condition of the vehicle, a voltage corresponding to the wheel peripheral speed is generated at the generator G-1, which output is subjected to smoothening effect by the condenser C1-1. The thus smoothed voltage is divided into the following three, more specifically, the first component thereof is conveyed to transistor T4-1, so as to provide the emitter voltage thereof. The second component is subjected to a differentiation by the combination of condenser c2-1 and resistor R3-1.

The voltage subjected to a differentiation by the resistor R4-1 is added with a bias voltage, and the resultant is subjected to phase inversion and amplification by the transistor T1-1, of which the collector potential variation at the transistor T1-1 is conveyed through coupling condenser C3-1 to the base of transistor T4-1, thus providing a positive voltage in function of the wheel deceleration when such deceleration occurs.

When the wheel circumferential speed is subjected to an acceleration, a negative pressure will be provided in the similar way and in response to such acceleration.

Either of these voltages is conveyed to the transistor T4-1 so as to provide a corresponding base potential thereof. However, with the vehicle travelling without any brake application, the appearing deceleration and acceleration in the wheel velocity are so small that it can be neglected in practice.

The third component is conveyed to condenser C4-1 to be charged therein. When the voltage corresponding to the wheel speed and subjected to the smoothening effect as abovementioned is smaller than that of the charged voltage, the charged voltage will be discharged through the combination of resistors R7-1 and R8-1, and the equivalent resistance at transistor T2-1.

Thus, it will be seen from the foregoing that under normal travelling state of the vehicle without any brake application, the charged voltage will always correspond to the wheel circumferential speed. Since, under these normal travelling condition of the vehicle, the vehicle speed and the wheel speed are substantially in coincidence with each other, a voltage corresponding to occasional vehicle speed is accumulated in the condenser C4-1, which is conveyed to transistor T3-1, when discharged, for being subjected to current amplification thereat, and subsequently is subjected to a voltage division corresponding to 80 percent through a resistors R11-1 and R12-1, so as to be conveyed to transistor T4-1. For providing a corresponding base potential thereof, or more specifically, a voltage corresponding to 80 percent of the vehicle speed for constituting the base electrode at transistor T4-1. Therefore, it will be seen that the transistor T4-1 represents its base voltage comprised by a sum of pressure corresponding to 80 percent of vehicle speed and the pressure corresponding to the wheel deceleration or acceleration. On the other hand, the emitter voltage appearing at transistor T4-1 corresponds to the voltage in response to occasional wheel speed, and therefore it corresponds to the vehicle speed under the normal travelling condition of the vehicle without any brake application.

As was referred to hereinbefore, the wheel deceleration or acceleration can be neglected under the normal vehicle travelling condition. The emitter voltage of transistor T4-1 will become larger than the emitter voltage of the same transistor. Therefore, transistors T5-1 and T6-1 will become non-conductive, to provide non-energizing current to solenoid S-1.

Next, referring to FIG. 3, the control operation of the aforementioned circuit arrangement will be described hereinbelow.

When the wheel is applied with a braking pressure, pressure-responsive resistor R9-1 will provide a smaller resistance in response to the applied brake pressure, thus increasing corresponding the base potential at transistor T2-1, and the equivalent resistance of the same transistor will become smaller than before. Therefore, condenser C4-1 will become liable to be discharged. As was referred to hereinbefore, condenser C4-1 is charged with a voltage corresponding to the wheel speed which is substantially equal to the occasional vehicle speed, when considered the operational condition of the circuit arrangements direct before the brake application.

When the brake is applied, the wheel speed will become correspondingly smaller and the condenser charge at C4-1 will be discharged through resistors R7-1 and R8-1, and the equivalent resistance of transistor T2-1. The discharging quantity will become larger with the increase of the larger brake application.

When the wheel is not locked, it will naturally be seen that the brake pressure and the vehicle deceleration are kept in relation to each other in a substantial degree. Therefore, when the condenser discharge rate appearing in response to the brake pressure is set so as to correspond to the vehicle deceleration degree, a voltage will be induced at the condenser C4-1 which corresponds to the occasional vehicle speed. Such voltage is called throughout the specification as "pseudo-vehicle speed voltage." This pseudo-vehicle voltage is conveyed to transistor T3-1 so as to be subjected to current-amplification thereat, and then is subjected to the voltage division corresponding to 80 percent in its amount by resistors R11-1 and R12-1. This modified voltage is called throughout this specification as "pseudo-vehicle speed voltage."

On the other hand, the decelerated wheel speed by virtue of the brake application will act upon the bias voltage which has been subjected to a differentiation through condenser C2-1, resistors R3-1 and R4-1 and appearing through resistors R3-1 and R4-1.

The thus lowered voltage is subjected to phase reversion through transistor T1-1, resistors R5-1 and R6-1, so as to provide a 80 percent-pseudo-vehicle speed voltage, upon being increased by such degree as in relation to the wheel speed deceleration by the coupling condenser C3-1, so as to provide a proper base voltage at transistor T4-1. This voltage corresponds to that denoted as 80 percent-pseudo-vehicle speed plus wheel deceleration or acceleration. On the other hand, the emitter of transistor T4-1 represents at this stage a voltage corresponding to the occasional wheel speed. When it is assumed that the braking force at this stage is relatively small, the wheel speed voltage is larger than the 80 percent-pseudo-vehicle speed and smaller than the wheel deceleration or acceleration degree, and the emitter voltage at transistor T4-1 is higher than that the base voltage at the same transistor. Thus, the transistor T5-1 becomes non-conductive, and does also the transistor T6-1. Therefore, no current will flow through solenoid S-1 and no alteration will occur in the brake applying pressure.

On the other hand, when considering the case wherein a sudden and substantial brake application is made so that a wheel lock is about to be invited, the wheel is naturally subjected to a substantial degree of decleration and a correspondingly larger degree of speed reduction in an appreciable sudden way, until it will become smaller than the combined value of the 80 percent-pseudo-vehicle speed plus the wheel deceleration or accleration. At this stage, the emitter voltage at transistor T4-1 will become smaller than the base voltage at the same transistor, resulting transistors T5-1 and T6-1 turning off. Current will thus flow through solenoid S-1 and after lapse of about 0.2 second, the brake pressure will initiate to reduce.

In practice, however, as shown schematically in FIGS. 3A–3C, the brake pressure will subjected to a reduction even at a stage where the wheel speed is still larger than the 80 percent-pseudo-vehicle speed. At this stage, however, the wheel speed is subjected to a relatively large degree of deceleration, it continues to reduce in its value and the wheel speed will be accelerated at a slighty smaller than 80 percent-pseudo-vehicle speed by previously and properly setting of the increase ratio of 80 percent-pseudo-vehicle speed in response to the wheel speed deceleration.

With acceleration of the wheel speed, the 80 percent-pseudo-voltage will be reduced by such degree as responsive to the wheel speed acceleration by the coupling condenser C3-1.

In this way, since the wheel speed will become larger and the sum of 80 percent-pseudo-vehicle speed plus wheel deceleration or acceleration will become conversely smaller until the emitter voltage at transistor T4-1 becomes larger than the base voltage of the same transistor. Therefore, transistors T5-1 and T6-1 become non-conductive and no current will flow through solenoid S-1 and the brake pressure will take its recovery tendency upon lapse of about 0.02 second time lag.

In practice, however, as shown in FIG. 3, the brake pressure will initiate its recovery tendency even at an earlier stage where the wheel speed still remain less than the 80 percent-pseudo-vehicle speed, but, practical initiation of wheel speed deceleration will initiate at a later stage where it exceeds beyond the 80 percent-pseudo-vehicle speed to a certain slight degree.

The aforementioned operational steps will be repeated while the wheel speed is dept substantially in coincidence with the 80 percent-pseudo-vehicle speed. These several operational steps will become more apparent by reference to several charts shown in FIGS. 3C–3E, which may be self explanatory.

The present embodiment is adapted for creation of the ratio between the wheel speed and the vehicle speed or that between (vehicle speed-wheel speed) and vehicle speed and the brake pressure control is preformed so as to keep it substantially constant for coinciding with 20 percent-slip ratio. For this purpose, in the present embodiment, a sum of wheel speed and vehicle speed is created, the slip ratio being kept at 20 percent. Thus, the wheel speed is controlled so as to maintain the ratio of wheel speed to vehicle speed substantially at a constant or more specifically at 0.8.

Next, referring to FIG. 4, the second embodiment of the circuit arrangement according to the invention will be described hereinafter in detail.

In FIG. 4, the shown circuit arrangement comprises a wheel speed sensing circuit I-2 which includes a d.c. generator G-2 fixedly attached to the shaft of an automotive vehicle wheel, not shown in the drawing for simplicity, for sensing occasional travelling speed of the vehicle to be braked under the control of the method and apparatus according to the invention.

This generator G-2 naturally develops a voltage output corresponding to the rotational speed of the vehicle wheel.

The positive pole of the generator is connected through a resistor R1-2 to a condenser C2-2, as shown, while the negative pole of the generator is connected to one side of a condenser C1-2, a resistor R2-2 being connected across the generator and in parallel to said condenser C1-2.

As commonly known to those skilled in the art, the aforementioned condenser will serve to smooth out unavoidable ripples appearing in the voltage output from the generator G-2, so as to provide a smoothening effect to the generator output.

The circuit arrangement shown in FIG. 4 comprises further a wheel deceleration sensor II-2 which includes a condenser C2-2 earthed through a resistor R3-2, while the opposite side of condenser C2-2 is connected electrically through a resistor R4-2 to the positive side of a battery B-2 and at the same time to the base electrode of a transistor T1-2. The related circuit part constitutes a differential circuit part, serving to differentiate the smoothed output voltage from the generator G-2, so as to deliver through resistors R3-2 and R4-2 to provide a proper bias voltage to the base electrode of the transistor T1-2 for keeping a base potential thereat.

The collector electrode of transistor T1-2 is connected through a resistor R5-2 to the positive pole of the battery B-2 and at the same time directly with a coupling condenser C3-2. The emitter of the transistor T1-2 is earthed through a resistor R6-2. The provision of transistor T1-2, resistors R5-2 and R6-2 serves for phase-inversion of the base potential of transistor T1-2 as well as for amplifying the same.

The amplified voltage is conveyed through the coupling condenser C3-2 in the form of a modified voltage as the wheel deceleration or acceleration voltage to the base of a transistor T3-2 comprised in a comparator V-1 to be described hereinafter.

The circuit arrangement shown in FIG. 4 further comprises as pseudo-vehicle setter III-2 comprising a diode, the anode of which is connected with the positive pole of the generator G-2, while the cathode side of the diode is connected to the base of a transistor T3-2 and at the same time earthed once through a condenser C4-2, and secondly through a series connection of resistors R7-2 and R8-2, a transistor T2-2 being connected across the latter resistor R8-2.

The emitter electrode of transistor T2-2 is earthed, while the base of the latter is connected through a paralled combination of pressure-responsive resistor R9-2 and condenser. C5-2 to the positive pole of the battery B. Although not shown, the resistor R9-2 is arranged to be subjected to hydraulic brake pressure, for instance, by being immersed in the hydraulic brake pressure pipe line, not shown, and electrically connected as shown. The base of transistor T2-2 is earthed through resistor R10-2.

As may be easily supposed, the condenser C4-2, accumulates the output from the generator G-2 and is adpated for discharge of the same through resistor R7-2 the equivalent resistance of transistor T2-2 and resistor R8-2.

With application of heavier brake, the resistance appearing at the resistor R9-2 will become correspondingly smaller, and vice versa. This nature of such pressure responsive resistor is highly known to those skilled in the art. Condenser C5-2 will serve for smoothening the effect of the variable resistor R9-2.

The circuit arrangement shown in FIG. 4 comprises further a ratio sensor circuit IV-2 which includes an amplifier A-2, soleniods S1-2 and S2-2 and magnetic resistors M1-2 and M2-2, these are electrically connected with each other as shown, and said circuit is adapted for sensing the ratio of wheel speed to vehicle speed, as will be described more in detail hereinbelow.

As seen from the foregoing, the output voltage from the amplifier corresponds to the ratio of resistance of M2-2 to resistance of M1-2. As symbolically described by a plurality of small arrows shown, the resistance value of magnetic resistor (magnetism responsive resistor) M2-2 will become larger with increased electromagnetic energization of solenoid S2-2. Or more specifically, it varies in response to the wheel speed.

In the similar way, the resistance value at M1-2 will vary in response to the electromagnetic energization of solenoid S1-2. One end of the output of the amplifier A-2 is connected to the emitter of transistor T3-2, and the other end thereof is fedback to the input of the amplifier A-2 through magnetic resistor M2-2. One end of solenoid S2-2 is connected through resistor R1-2 to generator G-2, the other end being earthed. Owing to the large amplification rate of amplifier A-2, the output of amplifier A-2 produces voltage corresponding to resistance value of resistor M2-2 added with that of M1-2.

The circuit arrangement shown in FIG. 4 further comprises a ratio-setting circuit V-2 adapted for setting a ratio of wheel speed to vehicle speed which is variable according to a wheel deceleration. The base of transistor T3-2 is connected to coupling condenser C3-2 and further to the positive pole of battery B1-2 through resistor R11-2, and is earthed through resistor R12-2. The emitter of transistor T3-2 is connected to output side of amplifier A-2 and is simultaneously earthed through a resistor R14-2. The collector of transistor T3-2 is connected to the positive pole of battery B1-2 through a resistor R13-2, and is further connected to the base of transistor T4-2 through a resistor T5-2. The emitter of transistor T4-2 is connected to the positive pole of battery B1-2. The collector of transistor T4-2 is earthed through a resistor R16-2, and is further connected to the base of a transistor T5-2. The collector of transistor T5-2 is connected to the positive pole of battery B1-2, the emitter thereof being earthed through solenoid S3-2. When current flows through solenoid S3-2, hydraulic pressure of wheels to be controlled is reduced, and when not, the hydraulic pressure of the same is restored. The positive pole of battery B1-2 is connected to amplifier A-2, resistors R5-2, R4-2 and R9-2, condenser C5-2, resistors R11-2 and R13-2, emitter of transistor T4-2 and collector of transistor T5-2, respectively. The negative pole of battery B1-2 is earthed. The positive pole of battery B2-2 is earthed, while the negative pole thereof is connected to amplifier A-2 and magnetic resistor M1-2.

The operation of the second embodiment of the circuit arrangement shown in FIG. 4 is as follows. A voltage corresponding to the wheel peripheral speed is generated at the positive pole of the generator G-2, which output is subjected to smoothening effect by the condenser C1-2. The thus smoothed voltage is divided into the following three, more specifically, the first component thereof is applied with bias voltage by resistors R3-2 and R4-2 so as to provide base potential of transistor T1-2 after being subjected to a differentiation by the combination of condenser C2-2 and resistor R3-2.

The phase reversion as well as current amplification is effected by transistor T1-2, resistors R5-2 and R6-2, so as to provide base potential of transistor T3-2 for the varied portion of collector potential of transistor T1-2 by coupling condenser C3-2.

In case of wheel deceleration, the positive voltage is applied to the base of transistor T3-2, and in case of wheel acceleration, negative voltage is applied to the base of transistor T3-2.

The second component is conveyed to condenser C4-2 to be charged with the voltage corresponding to the wheel speed, and the charged voltage is discharged through resistors R7-2 and R8-2, and equivalent resistance of transistor T2-2.

Thus, it will be seen from the foregoing that under normal travelling state of the vehicle without any brake application, the charged voltage will always correspond to the wheel circumferential speed. Since, under these normal travelling condition of the vehicle, the vehicle speed and the wheel speed are substantially in coincidence with each other, a voltage corresponding to occasional vehicle speed is accumulated in the condenser C4-2, which is conveyed to transistor T3-2, when discharged, for being subjected to current amplification thereat, and subsequently is subjected to a voltage division corresponding to 80 percent through a resistors R11-2 and R12-2, so as to be conveyed to transistor T4-2. For providing a corresponding base potential thereof, or more specifically, a voltage corresponding to 80 percent of the vehicle speed for constituting the base electrode at transistor T4-2. Therefore, it will be seen that the transistor T4-2 represents its base voltage comprised by a sum of pressure corresponding to 80% of vehicle speed and the pressure corresponding to the wheel deceleration or acceleration.

The condenser C4-2 is always charged with voltage corresponding to vehicle speed. Therefore, electromagnetic energization corresponding to vehicle speed always takes place in solenoid S1-2, thus producing resistance value corresponding to vehicle speed in magnetic resistor M1-2.

In the third component, voltage corresponding to wheel speed is smoothened by resistors R1-2 and R2-2, and condenser C1-2, thereafter energizing solenoid S2-2. Consequently, there is always produced electromagnetic energization corresponding to wheel speed, thus producing resistance value corresponding to wheel speed in the magnetic resistor M2-2.

The output of amplifier A-2 generates voltage corresponding to the resistance value of resistor M1-2 added with that of resistor M2-2. Namely, the voltage corresponding to wheel speed + vehicle speed becomes emitter potential of transistor T3-2. The base potential of transistor is obtained by the voltage corresponding to the ratio of 20 percent in the ratio of wheel speed to vehicle speed by dint of resistors R11-2 and R12-2.

When the emitter potential of transistor T3-2 is larger than the base potential thereof, transistors T3-2, T4-2 and T5-2 become non-conductive, which keeps current from flowing to solenoid S3-2, and vice versa.

Under the normal travelling state of vehicle, the brake pressure is substantially nil, and condenser C4-2 stores the voltage corresponding to vehicle speed equal to wheel speed. In this case, the resistance value of resistor M1-2 is equal to that of resistor M2-2. The emitter potential of transistor T3-2 is the voltage corresponding to the value of unity in wheel speed + vehicle speed. The base potential of transistor T3-2 in the voltage corresponding to the value of 0.8 in wheel speed + vehicle speed. Consequently, the emitter potential of transistor T3-2 is larger than the base potential thereof, no current flows to solenoid S3-2.

Next, referring to FIG. 5, the control operation of the aforementioned circuit arrangement will be described hereinbelow.

When the wheel is applied with too high braking pressure, the wheel tends to be suddenly locked and at the same time the deceleration thereof is increased. Also the voltage of emitter potential of transistor T3-2 becomes smaller than unity, while the base potential thereof becomes to have larger value than 0.8. Finally when the emitter potential of transistor T3-2 becomes smaller than that of the base potential thereof, current flows to solenoid S3-2. About 0.02 second after the flowing of current, the brake pressure is decreased. The wheel speed keeps on decreasing at the initial stage even if current starts to flow, but is initiated to be increased at the time when the value of wheel speed + vehicle speed is slightly smaller than 0.8. The emitter potential T3-2 is gradually increased to be larger than 0.8, while the base potential thereof is decreased to be smaller than 0.8. The emitter potential becomes again larger than the base potential, thus causing no current to flow to solenoid S3-2 and restoring the brake pressure after about 0.02 second. The wheel speed is increased at the initial stage, but is once again decreased when the value of wheel speed + vehicle speed exceeds 0.8. Thus, it will be seen that upon repetition of the aforementioned operations the wheel is so arranged and designed as to have approximate value of 0.8 in vehicle speed + wheel speed, namely, 20 percent of slip ratio. There are several means for seeking vehicle speed in the following manners.

1. The use of the fifth wheel
2. The sensing of deceleration in the travelling direction of the automotive vehicle
3. Inference of the road surface conditions from deceleration and acceleration of wheel.

Figure 6A:
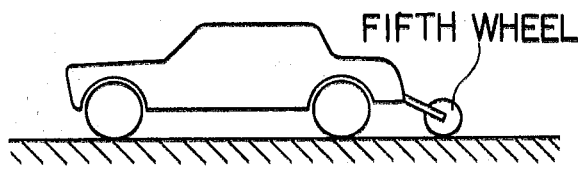
FIGS. 6A–6B are a combined illustration of a side view of an automotive car which is provided with a fifth wheel for sensing occasional wheel speed, as a third embodiment of the invention, and a simplified circuit adapted for the above purpose.
Figure 6B:
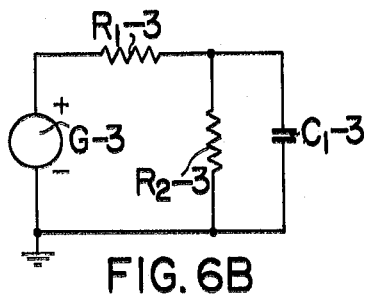

FIGS. 6A-6B show an embodiment of using the aforementioned fifth wheel which is mounted onto the automotive vehicle. A d.c. generator G-3 is provided in the fifth wheel. The d.c. generator generates voltage corresponding to the circumferential speed of the fifth wheel. Therefore, the d.c. generator G-3 produces voltage corresponding to vehicle speed, which is smoothened by resistors R1-3 and R2-3, and condenser C1-3.

Before entering into a specific and detailed description of the fourth embodiment of the apparatus adapted for carrying out the method of the invention, we will illustrate at first by reference to FIG. 7 a general physical rule governing the relationship between the adhesion coefficient appearing between the tyre of a running vehicle wheel, on the one hand, and the slip ratio appearing during application of braking upon the wheel, on the other hand, said slip ratio being normally expressed by S among those who are skilled in the art and the said coefficient being, denoted by mu as is commonly value generally with the slip ratio being normally expressed by S among those who are skilled in the art and the said coefficient mu will take its maximum value generally with the slip ratio S substantially equal to 0.2.

Therefore, in order to obtain a maximum possible braking efficiency and without inviting any fear of wheel lock, the braking operation should preferably be kept at in the neighborhood of 0.2 of slip ratio.

According to the conventional comparative hydraulic brake pressure control process, the wheel speed is controlled by varying the brake application pressure, so as to represent a wavy speed fluctuation progress during application of the braking pressure, as hinted in FIG. 8A, wherein the fluctuating amplitude amounted, according to our practical measurements, to an order of 10–30 km/hr. This showed, however, an invitation of substantial variation of the adhesion coefficient and a rather prolonged braking period, as was referred to hereinbefore.

In comparison with the above, the chart shown in FIG. 8B represents a representative result obtained according to the application of the novel teaching of the invention, wherein, as ascertained by our practical measurements, the wheel speed variation as appearing during the brake application could be reduced only to an order of 2–3 km/hr. or still less. The above unique feature can be applied naturally to the all cases of embodiments mentioned throughout the specification.

Figure 9:
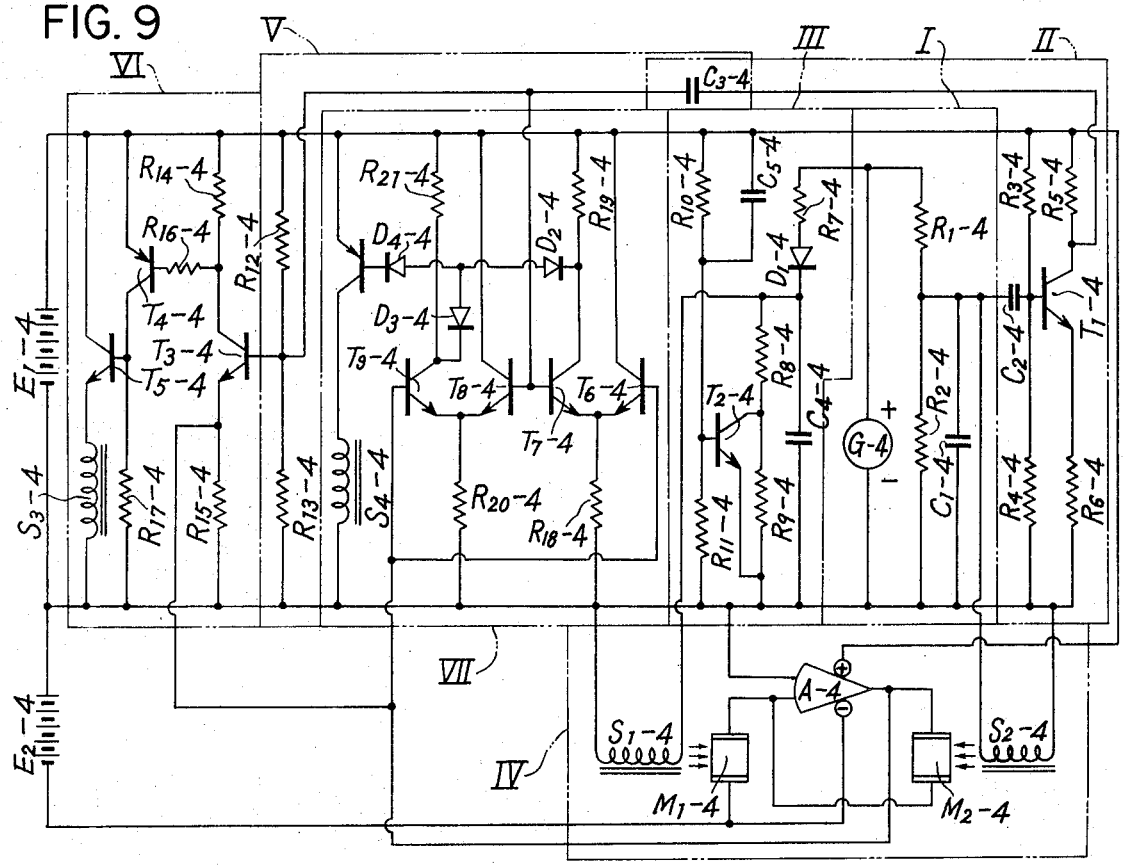
FIG. 9 is a similar view to FIG. 2, illustrative, however, of a fourth embodiment of the invention.
Figure 14:
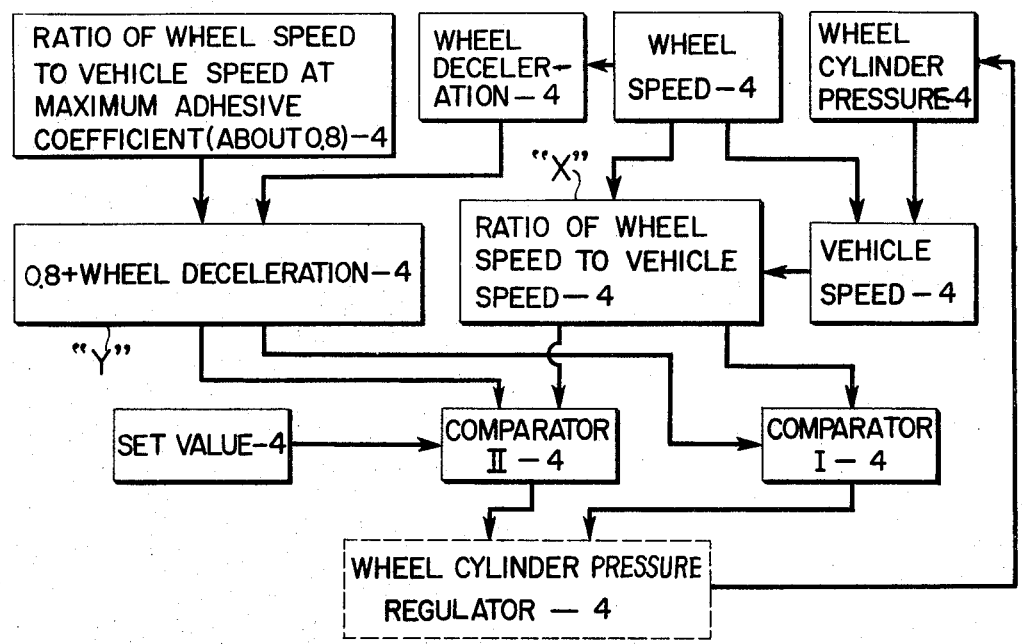
FIG. 14 is a block diagram showing in its basic form of the fourth embodiment of the pressure control circuit arrangement shown in FIG. 9.

In the fourth embodiment of the control circuit shown in FIG. 9, a first block I-4 represents a wheel speed or velocity senser which comprises a d.c. generator G-4 coupled to the shaft, not shown, of an automotive wheel, so as to provide its output in response to occasional wheel speed. The output voltage from the generator G-4 is subjected to a smoothening effect in a ripple-removing smoother circuit part comprising resistors R1-4 and R2-4, and condenser C1-4 which are connected with each other as shown.

Block II-4 constitutes a differentiator which is adapted for processing the wheel speed voltage supplied from the sensor I-4 for providing an output voltage corresponding to the occasional wheel deceleration or acceleration. For this purpose, this block II-4 comprises a condenser C2-4, coupling condenser C3-4, resistors R3-4, R4-4, R5-5 and R6-4 and transistor T1-4 which are connected with each other as shown.

Block III-4 represents a circuit part adapted for the delivery of a voltage responsive to the occasional wheel speed or velocity and comprises resistors R7-4, R8-4, R9-4, R10-4 and R11-4, condensers C4-4 and C5-4, diode D1-4 and transistor T2-4 which are connected with each other as shown.

Block IV-4 represents a circuit part adapted for providing a voltage corresponding to the ratio of wheel speed or velocity to vehicle speed or velocity from the vehicle speed voltage and wheel speed voltage. For this purpose, the block IV-4 comprises amplifier A-4 solenoid S1-4, solenoids S1-4, and S2-4, magnetism-responsing resistors M1-4 and M2-4.

Block V-4 comprises resistors R12-4 and R13-4 and coupling condenser C3-4 and is adapted for providing a reference voltage for the comparison of the voltage kept in relation to the wheel speed deceleration or acceleration with a voltage corresponding to the ratio of wheel speed to vehicle speed. Resistors R12-4 and R13-4 serves for performing necessary voltage division, as will be more fully described hereinafter.

Block VI-4 comprises resistors R14-4, R15-4, R16-4 and R17-4, transistors T3-4, T4-4 and T5-4, and solenoid S3-4, which are mutually connected as shown, and is adapted for providing no energizing current to solenoid S1-4 when the voltage corresponding to the ratio of wheel speed to vehicle speed exceeds the aforementioned reference voltage, and vice versa.

With energization of solenoid S3-4, the wheel brake cylinder pressure is subjected to a pressure reduction and with the solenoid de-energized, the wheel cylinder pressure will have a pressure restoring tendency. Thus, it will be seen from the foregoing that the block VI-4 constitutes a part of the wheel cylinder pressure adjustment.

Block VII-4 comprises transistors T6-4, T7-4, T8-4, T9-4 and T10-4, resistors R18-4, R10-4, R20-4 and R2'-4, diodes D2-4 and D3-4, Zener diode D4-4, and solenoid S4-4, and is adapted to provide energizing current to solenoid S2-4 when the absolute value of the differential between a voltage corresponding to the ratio of said wheel speed to vehicle speed, on the one hand, and the said difference voltage, on the other hand is larger than a predetermined voltage value and vice versa.

With de-energization of said solenoid S4-4, the speed for said brake pressure reduction and restoration is reterded, while, with the solenoid S4-4 energized, on the contrary, the reduction as well as restoration of the wheel brake pressure has a higher speed and thus, constitute a part of said wheel brake cylinder pressure adjuster.

Figure 10:
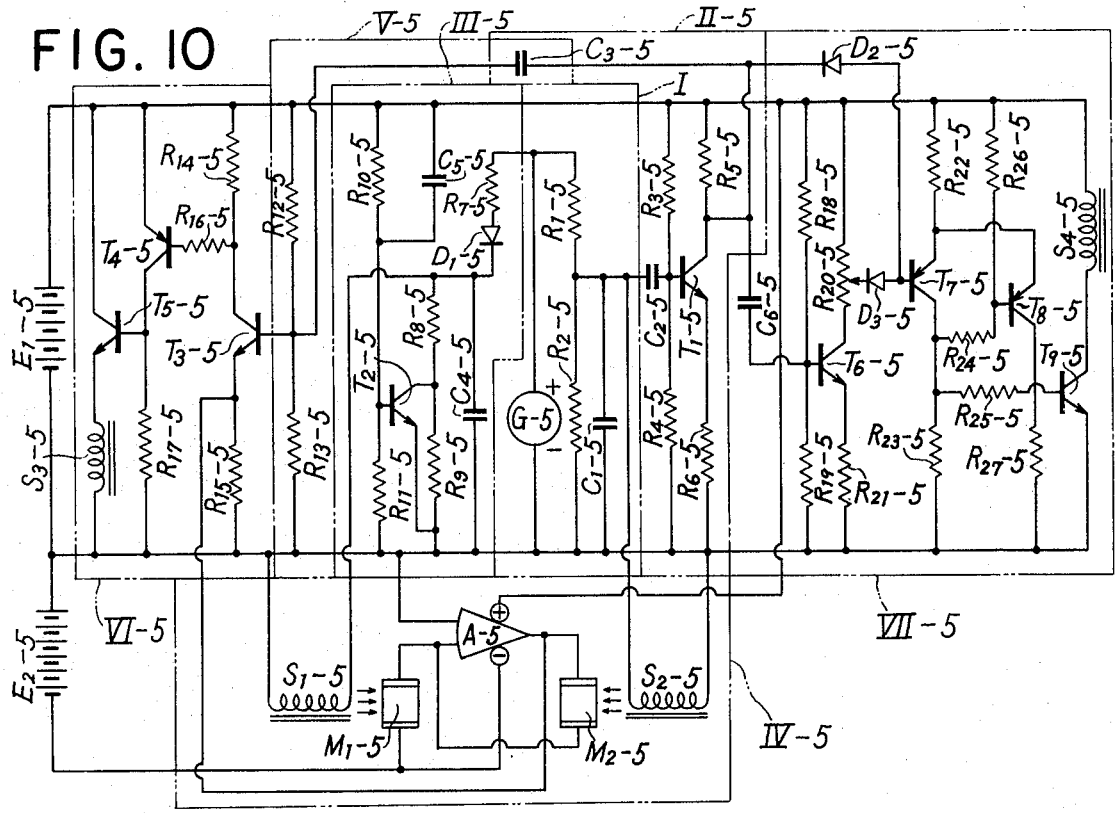
FIGS. 10 and 11 are similar views to FIG. 2, illustrative, however, of fifth and sixth embodiments of the invention, respectively.

Next, referring now to FIG. 10, the fifth embodiment of the pressure control circuit will be described in detai hereinbelow.

Blocks I-5 to VI-5 have same structure and function as those of the foregoing block VI-5, and thus a further details analysis thereof can be omitted for simplicity without sacrificing better understanding of the invention.

Block VII-5 comprises resisters R18-5, R19-5, R20-5, R21-5, R22-5, R23-5, R24-5, R25-5, R26-5 and R27-5, transistors T6-5, T7-5, T8-5 and T9-5, diodes D2-5 and D3-5, coupling condenser C6-5 and solenoid S4-5. In this block VII-5, when the absolute value of a voltage in relation to the occasional wheel deceleration or acceleration is larger than predetermined voltage value, current is allowed to flow through solenoid S4-5 for energization thereof, and vice versa.

Figure 13:
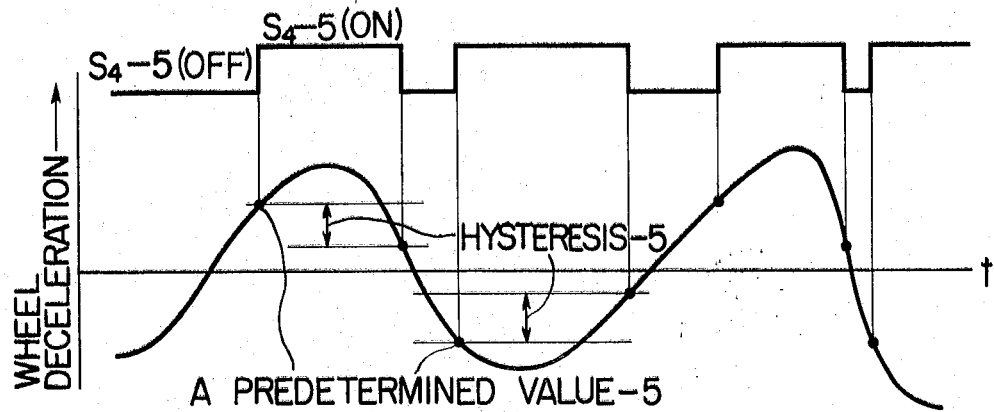
FIG. 13 is a chart showing a representative performance curve of a block shown at VII-5 in FIG. 10 illustrative of the fifth embodiment of the inventive pressure control circuit arrangement.

With use of this block VII-5, an operation as illustrated in FIG. 13 will be provided by utilization hysteresis owned by the Schmidt circuit, as will be described more in detail hereinafter. Solenoid S4-5 is designed and arranged as the corresponding solenoid employed in the foregoing embodiment VI.

When a voltage consisting of a sum of the divided voltage through resistors R12-6 and R13-6 from the wheel speed responsive voltage with the wheel speed deceleration or acceleration voltage is larger than the wheel speed responsive voltage, and vice versa.

Figure 11:
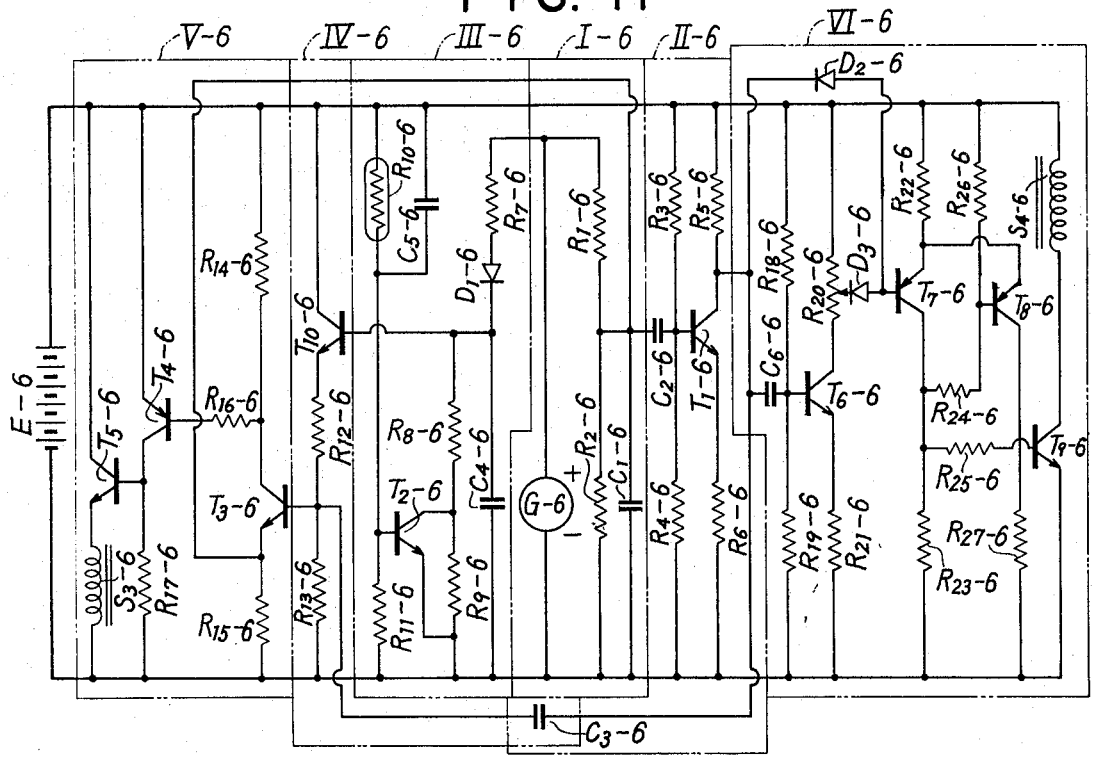

Next, referring to FIG. 11, the sixth embodiment of the control circuit arrangement will be described below in detail.

In this sixth embodiment comprises six block I-6 to III-6 are similar to those correspondingly employed in the aforegoing embodiments 4 and 5, and thus more detailed description thereof can be omitted without affecting on better understanding of the invention. In addition, it should be noted that block VI-6 is just same with the block VII-5 employed in the foregoing embodiment 5.

Block IV-6 comprises transistor T10-6, resistors R12-6, R13-6 and coupling condenser C3-6, and is adapted for adding the wheel deceleration or acceleration voltage to a voltage divided at resistors R12-6 and R13-6 from the vehicle speed representing voltage.

Block V-6 comprises resistors R14-6, R15-6, R16-6 and R17-6, transistors T3-6, T4-6 and T5-6 and solenoid S3-6. Solenoid S3-6 is same as that employed correspondingly the foregoing two embodiments 4 and 5. The block V-6 is adapted to deliver an energizing current to solenoid S3-6.

Next referring to FIG. 12, a wheel cylinder pressure control unit will be described in its design, arrangement and function by reference to the foregoing embodiments 4–6 only for convenience. It should be, however, noted that this pressure adjuster unit can be used with any embodiment shown in the present specification.

Figure 12:
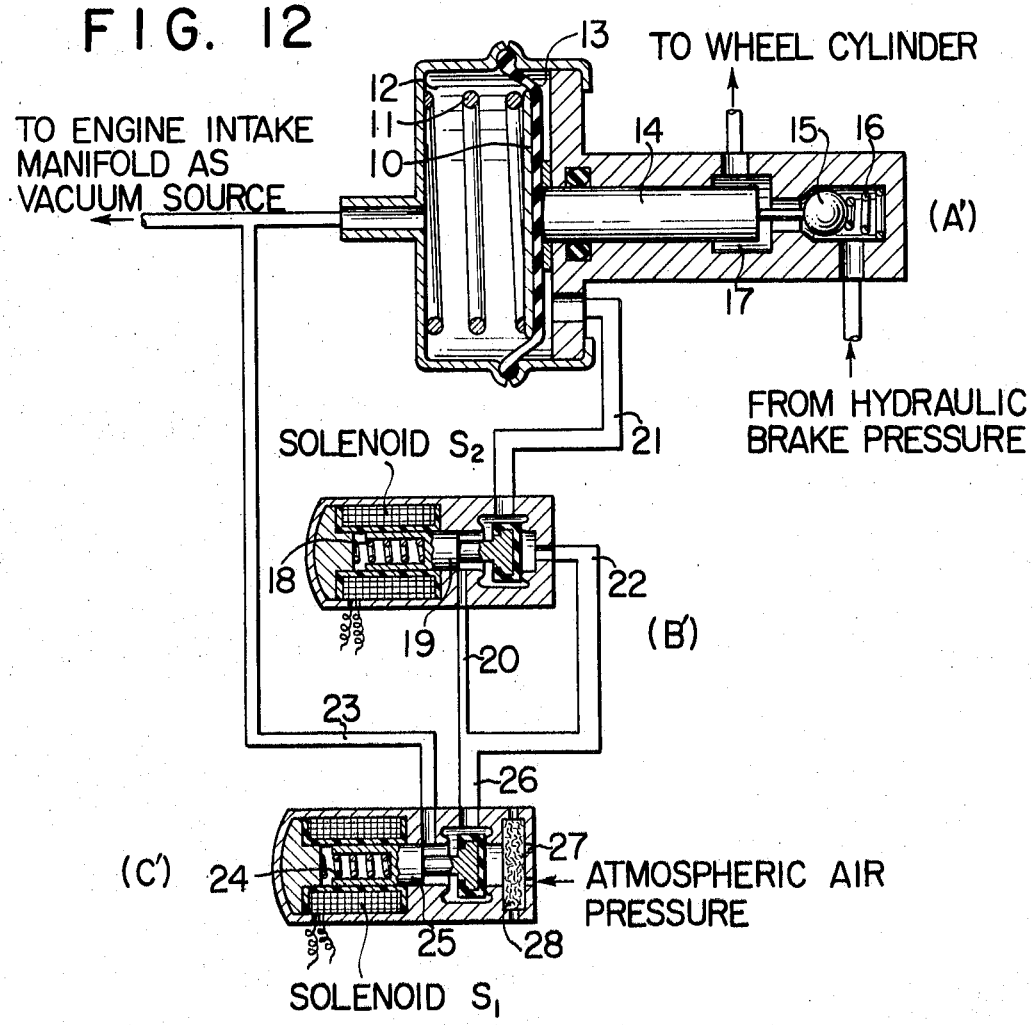
FIG. 12 is a schematic sectional view of several working components constituting a brake pressure controller arranged between the conventional master cylinder and the wheel cylinder and adapted for cooperation with the pressure control circuit embodied in any one of the embodiments set forth throughout the specification.

In FIG. 12, hose 23 is maintained always at a negative pressure by virtue of fluid connection with an engine intake manifold, not shown. On the contrary, port 27 is always kept in fluid communication with ambient atmospheric air pressure, as hinted in the drawing.

Now, it is assumed that no current flows through solenoid S3'. In this case, spindle 25 is urged by a spring 24 to interrupt fluid communication through said port 27 with said hose 26, while allowing a fluid communication between hoses 23 and 26. Therefore, hose 26 is kept at a negative pressure and at the present stage, valve unit B' is so positioned as to keep a chamber 13 provided in a pressure reducing unit A' at a certain negative pressure through said hose 21. On the other hand, it will be observed that chamber 12 is kept always at a negative pressure by virtue of the connection with the engine intake manifold as hinted. Under these conditions, diaphragm piston 10 is urged by a spring 11 to occupy such a position that it keeps ball valve 15 through it spindle port 14 at its valve opening position against the action exerted by a spring 16, as shown. Thus, in this case, the hydraulic brake pressure is equal to a wheel cylinder pressure. With energization of solenoid S3', spindle 25 is actuated to move in the direction against the spring action at 24, so as to interrupt fluid communication between hoses 23 and 26 and to establish or open the fluid communication between port 27 and hose 26. Therefore, at this stage, atmospheric air pressure will invade through filter 28 and through hose 26, valve unit B40 and hose 21 into the chamber 13 so that the latter is brought into atmospheric pressure. In this case, diaphragm piston 10 is caused to move against action of spring 11 so as to close the ball valve 15, spindle 14 continue to move so that the effective volume of chamber 17 is increased and the wheel cylinder pressure will be correspondingly reduced. At this stage, no current does not flow through solenoid S3'. Spindle 25 is moved under the action of spring 24 so that the communication between port 27 and hose 26 is interrupted. Therefore, the pressure prevailing in chamber 13 is from atmospheric to negative or vacuum or the reverse sense.

Under these operating conditions, the diaphragm piston is made under the action of spring 11 in the direction that the effective volume of chamber 17 is thereby reduced, especially by the movement of spindle port 14. In this way, the once reduced wheel cylinder pressure is increase to substantially the original valve, and the ball valve 15 is opened against the action of spring 16. Therefore, the wheel cylinder pressure will soon become substantially equal to the hydraulic brake pressure.

Therefore, it will be seen from the foregoing that with energization of solenoid S3', the wheel cylinder pressure is subjected to a reduction by the action of valve unit C'. On the contrary with the solenoid S3' having no current flowing therethrough, the wheel cylinder pressure is subjected to a restoration step.

With interruption of the current through solenoid S4' contained in the valve unit B', spindle 19 is moved under the action of spring 18 so as to interrupt the fluid communication between hoses 22 and 21 and to open or established fluid communication hoses 20 and 21.

As will be noted from the drawing, the hose 20 has a smaller bore diameter than that of hose 22, a slight time lag will be invited during change off from vacuum to atmospheric pressure or during the reversed progress occuring in the chamber 13. Same reterdation will be invited in the movement of diaphragm 10 and spindle 14 so that pressure reduction an restoration or the wheel brake cylinder pressure will be invited.

Upon current passage through solenoid S4', spindle 19 is moved agains the action of spring 18, so as to interrupt fluid communication between hoses 21 and 20 and to open or establish fluid communication between hoses 21 and 22.

Hose 22 has a comparatively large bore diameter so that a change-off from vacuum to atmospheric or the reverse sense transfer will be performed at a relatively high speed and thus the movement of diaphragm 10 and spindle 14 is carried into effect rather rapidly. Therefore, the pressure reduction and pressure restoration will be brought about rather quickly. In a practical and specific embodiment, the pressure range concerning said quick action amounts generally 1,000 – 2,000 kgs/sq.cm, while that concerning the said slow or retarded operation amounts to 100 – 200 kgs/sq.cm. The quicker range pressure is substantially same as conventional.

It will be seen thus from the foregoing that valve unit B' acts so that with energization of solenoid S440, it accelerates the pressure reduction and pressure restoration for the wheel cylinder pressure. On the contrary, de-energization of solenoid S4', it serves for retarding the said kind of pressure reducing and pressure restoring operation.

The operation of the block I commonly employed in the foregoing embodiments 4–6 is as follows;

The d.c. generator G will always generate a voltage corresponding to occasional wheel speed and this output voltage from the generator is subjected to a smoothening action provided by the combination of resistors R1 and R2 and condenser C1.

The operation of the block II commonly used in the foregoing embodiments 4–6 is as follows:

The wheel speed responsive voltage is subjected to differentiation by the combination of condencer C2 and resistor R4 and added with a bias voltage through resistor combination at R3 and R4, so as to provide a proper level of base potential at the transistor T1, while its collector voltage is obtained by current amplification and phase reversion of the base potential of the same transistor. At the coupling condenser C3, a voltage corresponding to the variation component will appear. More specifically, when a wheel deceleration occurs at the wheel, a positive voltage will be induced in the condenser C3. On the contrary, occurrence of an acceleration in the wheel rotation will invite the generation of a negative voltage at the coupling condenser C3.

The operation of block 111 commonly employed in the foregoing embodiments R – 6 is as follows:

As commonly known the pressure-responsive resistor R10 will provide a lower resistance with increase of the wheel cylinder pressure, and vice versa.

With higher resistance value at the resistor R10, the equivalent resistance at transistor T2 will become correspondingly higher, and vice versa.

Condenser C4 is always charged with a voltage corresponding to the occasional wheel speed or velocity, and the condenser charge will be discharged through the combination or resistors R8 and R9 and the equivalent resistance at the transistor T2.

With the brake in its non-applied position, wheel speed will correspond generally to vehicle speed, thus a voltage kept in relation with occasional vehicle speed or velocity being kept in reservation in the condenser C4.

When brake is applied under these operational conditions, the wheel speed responsive voltage will become lower than the condenser charge at C4, thereby the latter being reduced in response to the wheel brake pressure so as to bring the wheel speed deceleration rate by application of the wheel brake cylinder pressure into coincidence with the discharge rate at the condenser C4 influenced by the wheel brake cylinder pressure, thereby to make charge of a vehicle responsive pressure at condenser C4.

The operation of the block IV common to the fourth and fifth embodiments is as follows:

A current responsive to occasional vehicle speed will flow through solenoid S1 for modifying the resistance valve at the magnetism-responsive resistor M1. It will be seen, therefore, the resistance at M1 will varies with variation in the occasional vehicle speed or velocity. On the other hand, a current responsive to occasional wheel speed or velocity will flow through solenoid S2 and the resistance value at magnetism-responsive resistor M2 will vary in response to the variation in the occasional wheel speed. The amplifier A has a larger amplifying degree and the output from the amplifier is responsive to the ratio : resistance at M2/resistance at M1. It will be seen, therefore, that the voltage output from the amplifier A is kept in relationship with the ratio of wheel speed/vehicle speed.

Next, the operation of the block V common to the both embodiments 4 and 5 is as follows:

In this block a voltage corresponding to the ratio of wheel speed/vehicle speed being 0.8 which corresponds in turn to a 20 percent slip ratio is added with a further voltage responsive to occasional wheel deceleration as processed through the resistor combination of R12 and R13 and appearing at the coupling condenser C3.

Next, the operation of block VI commonly employed in the embodiments 4 and 5 is as follows:

It will be observed that the base voltage at the transistor T3 corresponds to the sum of 0.8 plus wheel deceleration (which is positive in case of deceleration and negative for acceleration), while the emitter voltage at the same transistor T3 corresponds to the ratio of wheel speed/vehicle speed.

With the base voltage at transistor T3 larger than the emitter voltage of the same transistor, transistors T3, T4 and T5 become conductive so that current will flow through solenoid S3. On the contrary, when the base voltage at T3 is lower than the emitter voltage of the same transistor, these transistors T3, T4 and T5 are non-conductive and no current will flow through the solenoid S3.

Next, the operation of the block VII-4 employed in the fourth embodiment is as follows:

In this block, a differential amplifier is constituted by resistors R18-4 and R19-4 and transistors T6-4 and T7-4. A further differential amplifier is constituted by resistors R20-4 and R21-4 and transistors T8-4 and T9-4. The base of each of the transistors T6-4 and T7-4 is applied with a voltage corresponding to the ratio of wheel speed/vehicle speed. The base voltage of each of the transistors T7-4 and T8-4 is used as the reference.

When the base voltage at the transistors T6-4 and T9-4 is substantially higher than the base voltage at the transistors T7-4 and T8-4, the base voltage at the transistor T10-4 will lower through Zener diode D4-4, diode D3-4, transistor T9-4 and resistor R20-4 so that transistor T10-4 will become conductive, for feeding current to solenoid S4-4.

When the base voltage at transistors T6-4 and T9-4 is slightly higher than the base voltage at transistors T7-4 and T8-4, the base voltage at transistor T10-4 is not subjected to reduction by the Zener diode D4-4. Thus, transistor T10-4 is non-conductive and no current will flow through solenoid S4-4.

On the other hand, when the base voltage of transistors T6-4 and T9-4 is substantially loser than the base electrodes T7-8 and T8-8, the base voltage at T10-4 is lowered through Zener diode D4-4, diode D2-4, transistor T7-4 and resistor R18-4, resulting in turn-on of the transistor T10-4 for conveying an energizing current to solenoid S4-4 for the energization thereof.

With the base voltage at transistors T6-4 and T9-4 slightly lower than that of transistors T7-4 and T8-4, the base voltage at T10-4 will not reduce by the Zener diode D4-4, resulting in turn-off of the transistor T10-4 and no current flow appearing at solenoid S4-4. Thus, in the block VII-4, there will be current passage through solenoid S4-4, when:

|(wheel speed/vehicle speed)– (0.8 + wheel speed deceleration)| >the valve predetermined by Zener diode D4-4, and vice versa.

The operation of blocks VII-5 and VI-6 of the fifth and sixth embodiments, respectively. is as follows:

At the cathodic side of diode D2, a positive wheel deceleration voltage and a negative wheel speed acceleration voltage are appearing over the bias voltage. Coupling condenser C6 will act to take out exclusively the variation component from the combined voltage, said component being processed through the resistors R18-R21 and transistors T6, so as to be subjected a phase conversion and added with a proper bias voltage. At the cathodic side of diode D3, there is a negative wheel speed receleration voltage or a positive wheel speed acceleration voltage over the bias voltage.

Resistors R22, R23, R24, R26 and R27, and transistors T7 and T8 constitute in combination a Schmitt circuit.

When it is now assumed that the wheel deceleration exceeds beyond a predetermined value by the Schmitt circuit, the diode D3 acts to lower the base voltage of transistor T7, thus the latter being the transistor T9 into its conducting state, thus current flowing through solenoid S4, and vice versa.

On the contrary, when the wheel acceleration signal exceeds the predetermined value by the Schmitt circuit, the diode D2 will act to lower the base potential at transistor T7, thereby transistors T7 and T9 being turned successively on, for conveying a current through the solenoid S4.

Upon increase of the wheel deceleration and acceleration beyond the predetermined value by the Schmitt circuit to such degree that current is conveyed through the solenoid, a decrease of the wheel deceleration or acceleration happens to occur, the effect will be as follows: Since the Schmitt circuit represents a certain degree of hysteresis, an interruption of current flow through said solenoid S4 will be invited at the predetermined value by the Schmitt circuit less about 0.5 volt as an example. Therefore, it will be seen from the foregoing that the set value for the timing to initiate current flow through the solenoid S4 is made larger under utilization of the hysteresis in the Schmitt circuit than the similarly set timing value to interrupt the once established current flow through the same solenoid S4. According to our practical experiment on specific embodiments, the set value of the former kind for allowing the current flow through the solenoid in case of wheel deceleration and acceleration amounted to about 2G, G denoting the gravity acceleration.

The set value for interruption of current flow through the solenoid S4 may preferably be chosen to about 0.2G, as a representative example for obtaining favorable results.

Next, the operation of the block IV-6 employed in the foregoing example is explained hereinbelow as follows:

The emitter voltage at the transistor T10-6 corresponds to a voltage responsive to the vehicle speed. By properly selecting the values resistors R12-6 and R13-6, a voltage responsive to the vehicle speed multiplied by 0.8 is provided and added through the coupling condenser C3-6 to the voltage responsive to the wheel deceleration, so as to provide the corresponding base voltage at the transistor T3-6. It will be seen, thus, that the base voltage of transistor T3-6 corresponding to the sum of 0.8 x vehicle speed plus wheel deceleration.

Next, the operation of the block V16 employed in the foregoing sixth embodiment is as follows:

The base voltage of the transistor T3-6 is responsive to (0.8 x vehicle speed plus wheel deceleration), while the emitter voltage of the same transistor is responsive to wheel speed.

When the base voltage of transistor T3-6 is larger than the emitter voltage of the same transistor, transistors T4-6 and T5-6 will be conductive in succession.

Conversely, when the base voltage at T3-6 is lower than the emitter voltage of the same transistor, the transistors T3-6, T4-6 and T5-6 will become off in succession, thus no current flowing through solenoid S3-6.

In the following, the overall operation of the foregoing fourth embodiment will be given:

Concerning the first comparator I-4, the wheel cylinder pressure will be subjected to a restoration step when "X" is larger than "Y," On the contrary, the wheel cylinder pressure will be subjected to a pressure reducing step when "X" is smaller than "Y."

Concerning the second comparator II-4, the wheel cylinder pressure will be subjected to a rather quicker pressure-restoration or pressure-reducing step, when |"X" − "Y"| is larger than the preset value.

Conversely when the absolute value: |"X" − "Y"| is smaller than the preset value, the sheel cylinder pressure will be subjected to a slower pressure-restoration or -reducing step.

Under normal travelling period of the vehicle without application of any brake, the wheel cylinder pressure is nil so that the vehicle speed is approximately equal to the wheel speed, the value of "x" being nearly 1.0. In this case, the wheel speed deceleration will amount nearly to nil so that the value of "Y" is nearly 0.8. Thus, the relation "X" being larger than "Y" is established. Therefore, the wheel cylinder pressure is in the state of pressure-restoration, so to speak. Therefore, no current will flow through solenoid S3-4. Therefore, the brake is kept in its off-service position.

When the brake is applied, the wheel speed will naturally become smaller and smaller, thus developing a wheel speed deceleration. Thus, the value of "X" will shift from 1.0 towards nil. On the other hand, the value of "Y" will shift from 0.8 towards a larger value. If the brake application is so aprupt and substantial as to invite a disadvantageous wheel lock, the hitherto established relation: "X" being larger than "Y" will turn to the opposite relationship: "X" being smaller than "Y." At this stage, the comparator I-4 will be actuated for inviting a pressure reduction in the wheel cylinder pressure. At the initial stage of this wheel pressure reducing step, the absolute value: |"X" − "Y"| is naturally smaller than the present value, the pressure reducing velocity will become slow by virtue of the provision of the second comparator II-4. In the case of relatively small degree of wheel speed deceleration, the value |"X"−"Y"| do not rise up beyond the preset value, thus the wheel cylinder pressure being subjected to control at a slow speed mode. But, when the brake pressure is caused to rise up in a very aprupt manner or so, and when the wheel cylinder pressure reduction rate is slow as before, the relationship |"X" − "Y"| being smaller than the preset value can no more be maintained. Thus, the opposite relationship: |"X" − "Y"| being larger than the preset value will be invited. At this stage, the second comparator II-4 will act to speed up the wheel cylinder pressure reduction so that the wheel speed is received rather abruptly, thus the original relationship |"X" − "Y"| being smaller than the preset value is recovered. The second comparator will act to retard the wheel cylinder pressure reducing step. In the progress of the pressure reducing step, the relationship: "X" being smaller than "Y" will turn to the opposite relationship: "X" being larger than "Y." At the initial stage of the wheel cylinder pressure restoration step, the relationship: |"X" − "Y"| being smaller than the preset value is naturally maintained so that the pressure-restoration speed is slow. When the wheel cylinder pressure is subjected to reduction in the above mentioned way, the wheel speed is recovered at a slow speed, thus the value: |"X"−"Y"| does not become larger than the preset value. Therefore, the wheel cylinder pressure will rise up slowly with the pressure recovery speed for that pressure kept at a low rate and thus, the wheel speed is subjected to a slow reduction.

Under these pressure control conditions, the shifts between the first relationship: "X" being larger than "Y" and the second relationship: "X" being larger than "Y" are brought about at the frequency of about 7 c/s, as a practical example, while the value |"X"−"Y"| is kept always smaller than the preset one, resulting in the speed or velocity in the wheel cylinder pressure reduction and restoration kept at a low value. By this reason, variation of the wheel speed is kept at a possible minimum.

When, however, the road surface condition is turned from a high-*mu* to a low-*mu* one, under the above mentioned rather stabilized operating condition, or the reversed state is invited, as the case may be, during a vehicle travelling period, the slower operating rate for the repeated pressure reduction and restoration will not be proper for desired control purpose. Thus, the value |"X"−"Y"| will amount to a higher value than the preset one. In this case, however, the second comparator II-4 will be brought into actuation so as to modify the repeated pressure reducing and recovery operation in its more accelerating sense, for establishing a newly stabilized operating condition.

It will be seen from the foregoing that in case of an abrupt change in the brake pressure or in case of an abrupt change in the travelling surface condition, the wheel cylinder pressure reducing and recovery speed is modified towards an accelerated operation, and when a stabilizedly operating condition is attained, the pressure reducing and recovery speed is modified towards a slow-downed mode, so as to suppress the otherwise met considerable variation in the wheel running speed to a possible minimum.

Figure 15:
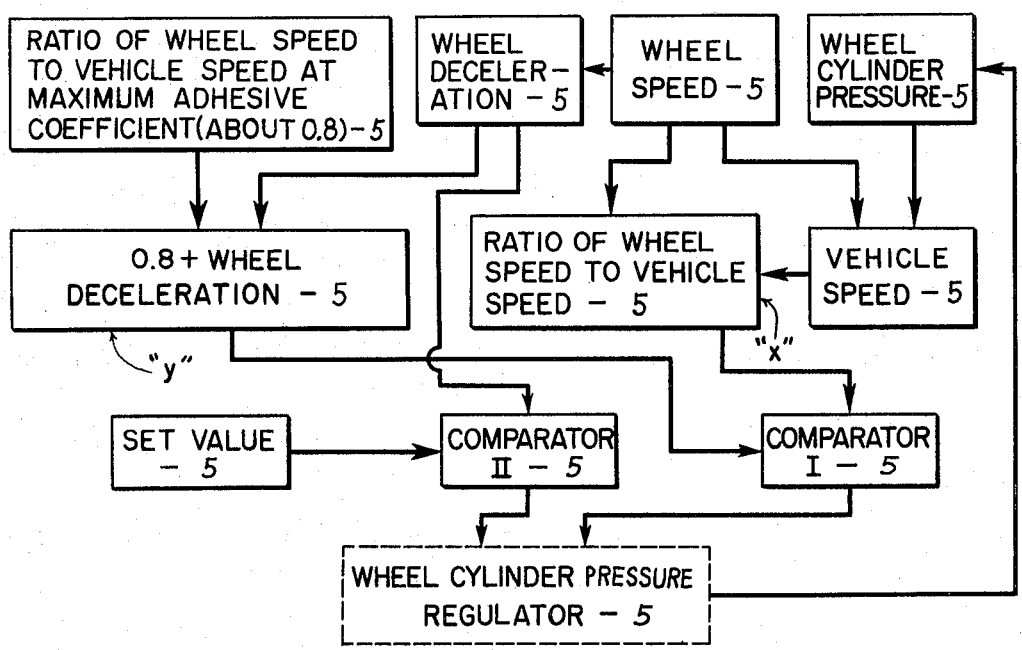
FIG. 15 is a similar view to FIG. 14, illustrative of the fifth embodiment shown in FIG. 10.
Figure 17:
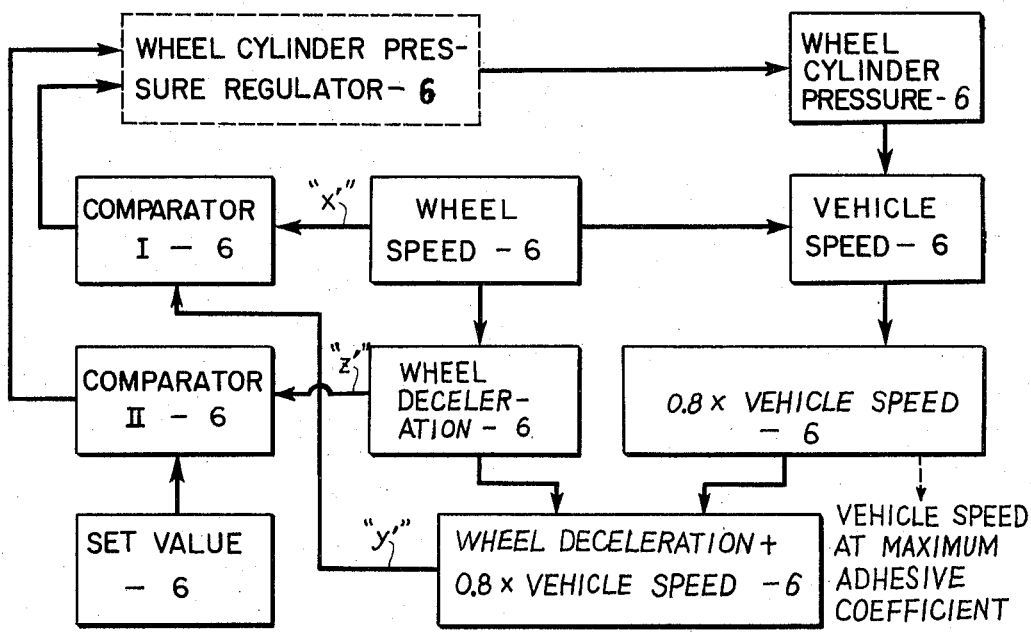
FIG. 17 is a similar view to FIG. 2, illustrative, however, of a sixth embodiment of the circuit arrangement.

Next, the overall working mode of the foregoing fifth embodiment is given hereinbelow in detail, by reference to FIG. 15.

In the case of the relationship: "X" being larger than "Y" concerning the first comparator I-5 of the present embodiment, solenoid S3-5 is kept in its deenergized condition, thus the wheel cylinder pressure being subjected to a pressure recovery step. The second comparator II-5 is kept in a position as shown in FIG. 16.

Under normal running condition of the vehicle without application of any braking, the relationship: "X" being larger than "Y" is maintained and the brake is kept in its off-service condition.

Under the braking condition, the application of the hydraulic brake will invite a retarded wheel speed than the vehicle speed at this stage, thereby a wheel speed deceleration being brought about. Thus the value of "$x$" will initiate to shift from 1.0 towards nil. On the other hand, "$y$" will initiate to shift from 0.8 towards a higher value.

When the brake application is so abrupt and substantial that a disadvantageous wheel lock is about to be invited, the relationship: "$x$" being larger than "$y$" is turned to the opposite relationship: "$x$" being smaller than "$y$." At this stage, the first comparator I-5 will be actuated so as to subject the wheel cylinder pressure to a pressure reduction. When, at this stage, the value of "$z$" is rather high and the wheel speed is being subjected to a rather abrupt reduction, the second comparator II-5 will act to speed up the wheel cylinder pressure reduction. By this pressure control operation, the wheel speed is modified at a rather low rate, resulting in a reduced value of "$z$" so as to provide a slow downed pressure reduction in the hydraulic wheel cylinder or cylinders, and the wheel speed is also recovered at a slow speed. When the relation: "$x$" being larger than "$y$" is attained, the comparator I-6 will brought into actuation so that the wheel cylinder pressure is subjected now to a pressure recovery step. At this stage, the wheel speed variation will become rather small and the value of "$z$" can not rise up beyond the preset value, thus the pressure recovery in the wheel cylinder system being brought about at a rather slower rate. The wheel speed is subjected again to a decelerating step, but in a low rate, thus the value "$z$" being unable to rise up beyond the preset value and then a stabilized pressure control condition being maintained. The mutual and repeated shifts between the first relationship: "$x$" being larger than "$y$" and the second relationship: "$x$" being smaller than "$y$" is performed at a frequency of about 7 c/s, as a practical example, while the value of "$z$" is kept always below the present value. Thus, the pressure reduction and recovery speeds appearing in the hydraulic brake system are rather slow and the variation in the wheel speed is only small.

When, however, the road surface is changed during travel of the vehicle therealong from a high-mu to a low-*mu* condition or in the reverse direction, under the present rather stabilized brake pressure control condition, the value of "$z$" may rise up beyond the preset value. This will result in an actuation of the second comparator II-6 for speeding up the brake pressure control operation in the pressure reducing and recovery senses, thereby a stabilized control condition being again established.

Therefore, it will be seen from the foregoing that in case of a sudden and substantial change in the braking pressure or alternatively or simultaneously therewith, in case of a substantial change in the road surface condition concerning its adhesion coefficient, the pressure control steps in the aforementioned both directions are performed in a speeded-up manner so as to invite a stabilizedly operating condition, and so on.

In the foregoing several embodiments, the occasional vehicle speed or velocity is sensed on the basis of a certain relationship existing between the hydraulic brake pressure and the wheel speed or velocity. But, the vehicle speed or velocity can be derived from any other convenient parameter, as was referred to hereinbefore with reference to FIGS. 6A–6B.

Figure 19:
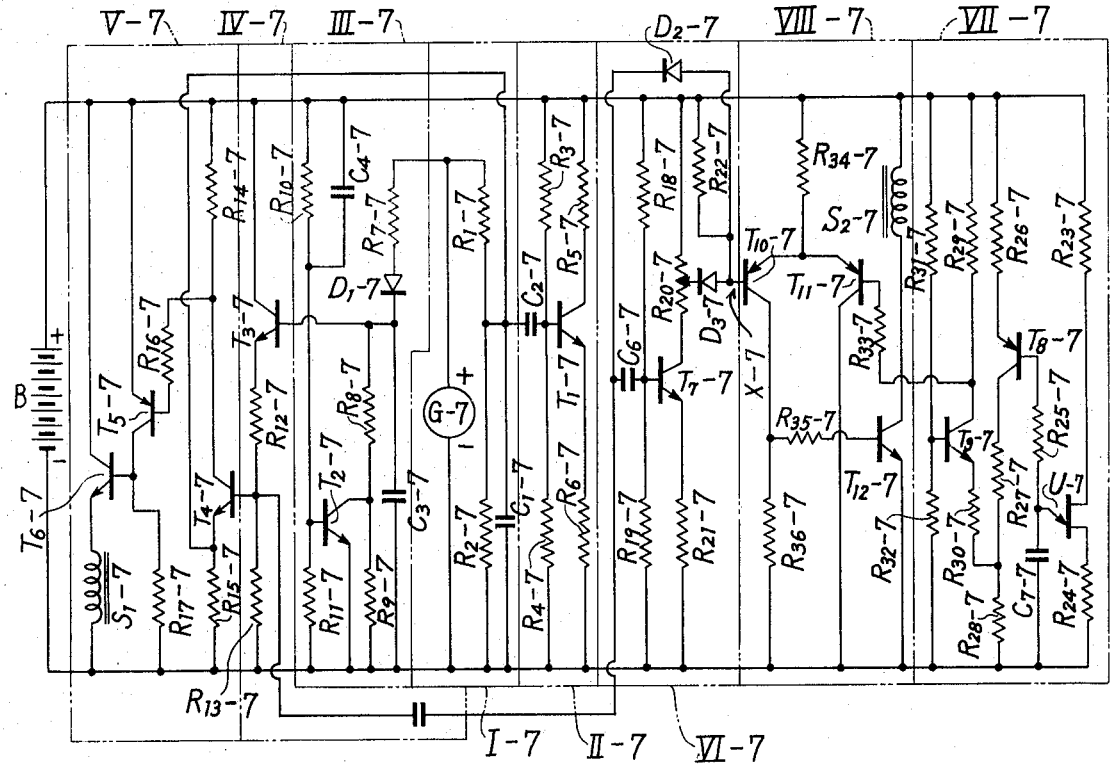
FIGS. 19 and 20 are similar views to that shown in FIG. 2, illustrative, however, of a seventh and an eighth embodiments of the circuit arrangement, respectively.

Referring now to FIG. 19 illustrative of a wiring diagram of the seventh embodiment of the invention, the circuit arrangement comprises eight circuit blocks I-7 - VIII-7 as shown The block "I" comprises a d.c. generator G-7, resistors R1-7, R2-7 and a condenser C1-7. The block "II" is adapted for differentiating the voltage obtained from the above mentioned block I which voltage corresponds to the wheel speed, so as to provide a voltage corresponding to the wheel deceleration or acceleration. The circuit block II-7 comprises a condenser C2-7, resistors R3-7 to R6-7, and transistor T1-7.

The circuit block III-7 is adapted for providing a wheel speed responsive voltage fed from the block I-7, and a further voltage responsive to the vehicle speed. For this purpose, the block III-7 comprises resistors R8-7 to R11-7 of which the resistor R10-7 has been formed into a pressure-responsive resistor of the kind already referred to in foregoing several embodiments. The block III-7 further comprises diode D1-7, condensers C3-7 and C4-7, and transistor T2-7. These circuit elements are electrically connected with each other as shown.

The block IV-7 is adapted for delivery of a voltage responsive to (vehicle speed multiplied by alpha plus wheel deceleration or acceleration) based uon the wheel deceleration or acceleration-responsive voltage fed from the second block II-7 and the vehicle speed-responsve voltage fed from the third block III-7, wherein, however, the following mathematical relationship exists:

$$1 - alpha = SO$$

wherein, SO stands for a specific slip ratio referred to hereinbefore with relation to the preamble part description of the present specification.

For this purpose, the present fourth block IV-7 comprises resistors R12-7 and R13-7, transistors T3 and coupling condenser C5-7.

Fifth block V-7 consists a kind of a comparator which serves for providing no energizing current to solenoid S1-7, when the vehicle speed-responsive voltage fed from the first block I-7 is larger than the voltage fed from the fourth block IV-7 and responsive to the value: (vehicle speed multiplied by alpha plus wheel deceleration or acceleration), and vice versa. For this purpose, the fifth block V-7 comprises resistors R14-7 to R17-7, transistors T4-7 to T6-7, and solenoid S4-7, which are electrically connected with each other as shown. Sixth block VI-7 is adapted to a voltage having its value corresponding to the absolute value of the wheel deceleration or acceleration signal fed from the second block II-7. For this purpose, this block VI comprises resistors R18-7 to R22-7, coupling condenser C6-7, diodes D2-7 and D3-7, and transistor T7-7.

Seventh block VII-7 is a kind of oscillator which is adapted for delevery of a series of triangular wave signal voltages. For this purpose, this block VII-7 comprises resistors R23-7 to R32-7, transistors T8-7 and T9-7, condenser C7-7 and a unijunction transistor U-7.

Eighth block VIII-7 is a kind of comparator which is adapted for comparison of the voltage output fed from the foregoing block VI-7 and responsive to the absolute value of wheel deceleration or acceleration, with the signal output from the foregoing seventh block VII-7 in the form of a series of triangular signal voltage pulses, thereby, being based upon the comparison results, supplying or interrupting a current flow through the solenoid S2-7. For this purpose, this block VIII-7 comprises resistors R33-7 to R36-7, transistors T10-7 to T12-7, and solenoid S2-7.

Figure 20:
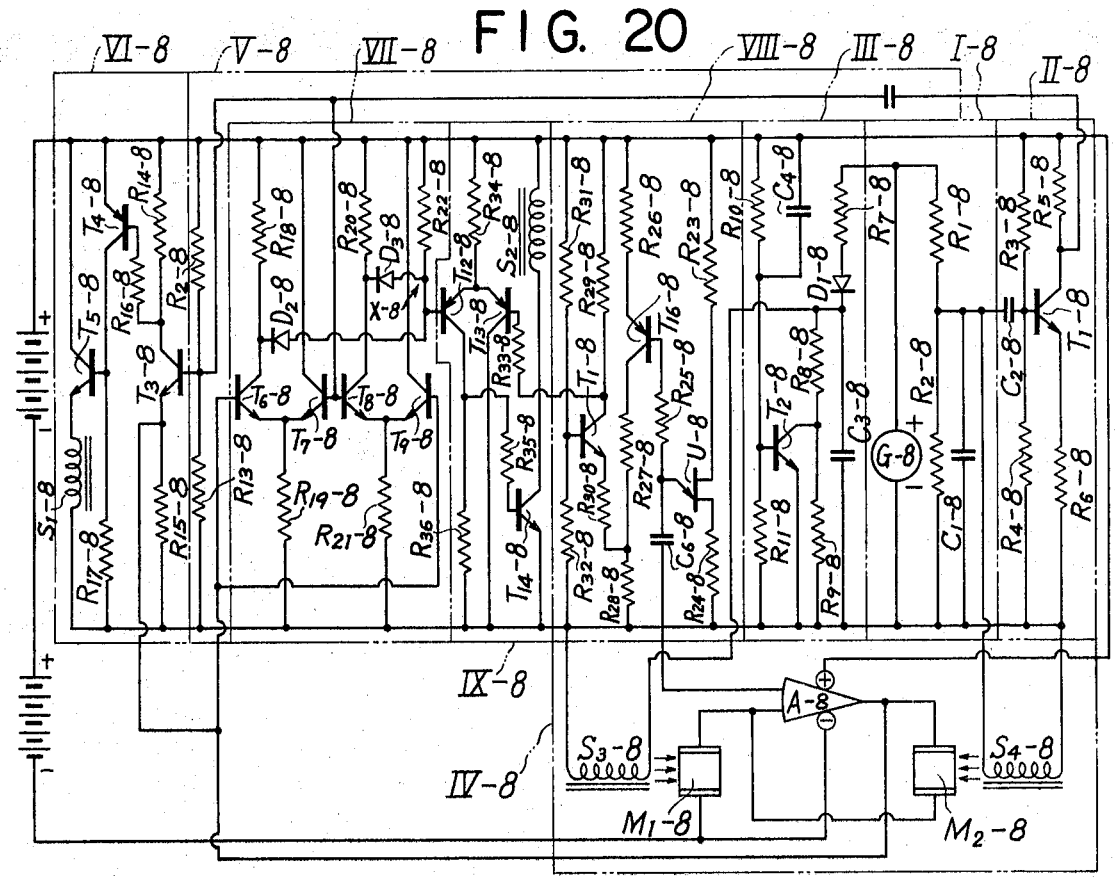

The eighth embodiment shown in FIG. 20 comprises nine blocks I-8 to IX-8 as shown.

First Block I-8 comprises a d.c. generator G-8, resistors R1-8 and R2-8, and a condenser C1-8, the arrangement and function are similar to those of the block I-1 and the like.

Second block II-8 has similar arrangement and function with those of the block I-1 and the like, and comprises condenser C2-8, resistors R3-8 to R6-8 and transistor Ti-8.

Third block III-8 has a similar arrangement and function as those of the block III-1 and comprises resistors R7-8, R8-8, R9-8 and R11-8, pressure responsive resistor R10-8, diode D1-8, condenser C3-8 and C4-8, and transistor T2-8.

Fourth block IV -8 has a similar arrangement and function to those of the block amplifier A-8, magnetism-responsive resistors M1-8 and M2-8, and solenoid S3-8 and S4-8.

Fifth block V-8 has a similar arrangement and function with those of the block V-7 and comprises coupling condenser C5-8, and resistors R12-8 and R13-8.

Sixth block VI-8 has a similar function VI-7 and comprises resistors R14-8 to R17-8, transistors T3-8 to T5-8, and solenoid S1-8 connected with each other as shown.

Seventh block VII-8 has a similar arrangement and function as those of the block VII-7 and comprises resistors R18-8 to R22-8, transistors T6-8 to T9-8, and diodes D2-8 and D3-8.

Eighth block VIII-8 is a similar block to VII-7 in the foregoing seventh embodiment and constitutes an electronic oscillator adapted for generation and delivery of a series of triangular wave pulse signals and comprises resistors R23-8 to R32-8, condenser C6-8, transistors T10-8 to T11-8, and a unijunction transistor U-8.

Nineth block IX-8 constitutes comparator which is adapted for comparison of the voltage signal supplied from the seventh block VII-8 and responsive to

|wheel speed/vehicle speed − (alpha + wheel speed deceleration or acceleration)| with the signal of triangular pulses fed from the eighth block, for on-off control of current passage through the solenoid S2-8, and, for this purpose, comprises resistors R33-9 to R36-9, transistors T12-9 to T14-9, and solenoid S2-9.

The foregoing seventh to ninth embodiments are arranged to cooperate with a brake pressure regulator unit having a similar arrangement and function with those of the pressure regulator unit shown as the third embodiment in the foregoing, although not specifically shown and described.

The operation of the seventh embodiment is as follows:

It will be easily seen that a wheel speed-responsive voltage signal is generated in the first block I-7 and, it will be upon being smoothed out, delivered from the block as its output.

In the second block II-7, the wheel speed-responsive signal voltage thus generated and smoothed is subjected to differentiation by the provision of condenser C2-7 and resistor R4-7 and added with a bias voltage through resistors R3-7 and R4-7, thence fed to transistor T1-7 for providing its base potential, while a collector voltage will be provided at the same transistor by current-amplifying the base potential and phase-amplifying the same. The output voltage from this block will become higher with generation of a deceleration in the wheel speed, and vice versa. Thus, a wheel speed deceleration or acceleration-responsive signal voltage is obtained.

In the third block III-7, the pressure-responsive resistor R10-7 has a similar nature to that of the resistor R9-1. It will be easily seen that the condenser C3-7 accumulates therein always a voltage charge which is responsive to occasional vehicle speed or velocity.

In the fourth block IV-7, the base potential at transistor T3-7 corresponds to the vehicle speed-responsive voltage which is subjected to current amplification and processed through resistors R12-7 and R13-7 so as to provide a voltage responsive to the value of the vehicle speed multiplied by alpha which may preferably be about 0.5 − 0.9 as a practical example.

Through the coupling condenser C5-7, the variation component only is taken out from the wheel speed deceleration or acceleration-responsive voltage fed from the second block II-7 and conveyed to transistor T4-7 for providing the latter as its base potential corresponding to the value: (vehicle speed multiplied by alpha plus wheel speed deceleration or acceleration). The related parts are so designed and arranged that the generation of a wheel speed deceleration will elevate the potential and vice versa.

In the fifth block V-7, when the wheel speed-responsive voltage fed from the second block II-7 is lower than the voltage fed from the fourth block IV-7 in response to the value of (vehicle speed multiplied by alpha plus wheel speed deceleration or acceleration), transistors T4-7, T5-7 and T6-7 will become conductive, for allowing a current passage through the solenoid S1-7.

Conversely, when the wheel speed-responsive voltage fed from the second block II-7 is higher than the output voltage from the fourth block IV-7 responsive to the value of (vehicle speed multiplied by alpha ± wheel speed deceleration or acceleration), transistors T4-7, T5-7 and T6-7 will become non-conductive in succession so that no current is allowed to flow through the solenoid S1-7.

At the cathodic side of diode D2-7 in the sixth block VI-7, there is the voltage fed from the second block II-7 responsive to the wheel speed deceleration or acceleration, and when a wheel speed deceleration occurs, that voltage will become higher. Through the coupling condenser C6-7, only the occasional variation component will be taken out from the wheel speed deceleration or acceleration-responsive voltage and added with a bias voltage by the provision of resistors R18-7 and R19-7, thence conveyed to the transistor T7-7 for being subjected to phase conversion. Thus, it will be seen that a wheel deceleration or acceleration-responsive voltage appears at the cathodic side of diode D3-7 which voltage will become higher when an acceleration occurs in the wheel running speed. More specifically, the wheel deceleration or acceleration-responsive voltage appears at the cathodic sides of both diodes D2-7 and D3-7, respectively, and indeed, in the form of those which have mutually opposite phases.

In the seventh block VII-7, the triangular wave pulse signals appearing at the condenser C7-7 are subjected to current amplification through transistors T8-7 and T9-7 and the amplified triangular voltage pulses will appear at the collector electrode of transistor T9-7. The frequency of these triangular voltage pulses amounts generally and preferably to about 15 – 30 c/s.

In the eighth block VIII-7, when the base potential at T10-7 is higher than that at T11-7, transistor T12-7 will become non-conductive and thus, no current will flow through the solenoid S2-7, and vice versa.

Figure 21A:
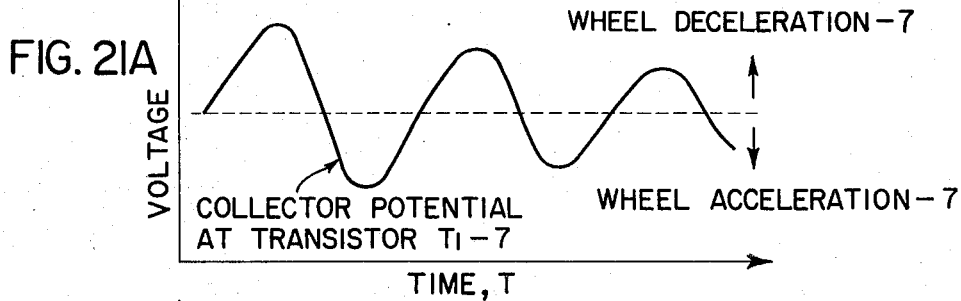
FIGS. 21A–21B are a combined chart illustrative of the working mode of the seventh embodiment shown in FIG. 19.
Figure 21B:
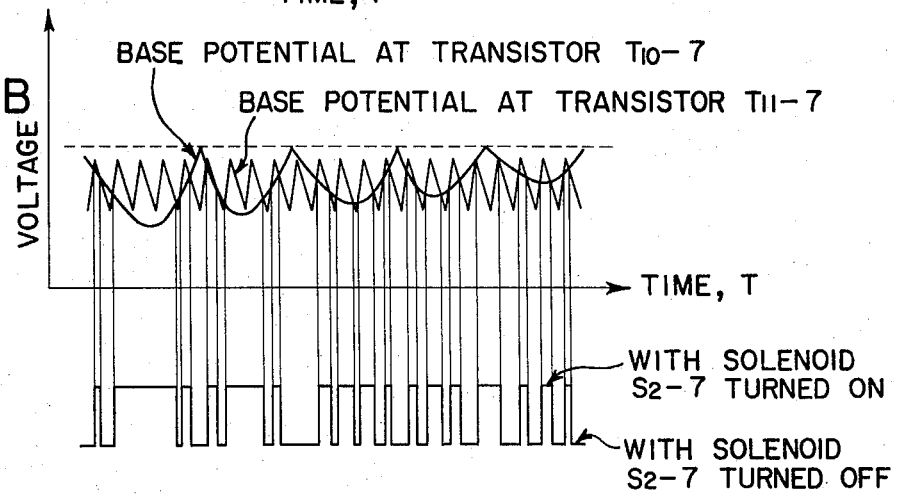

The aforementioned operation mode is clearly shown in the combined chart shown in FIGS. 21A–21B.

With larger absolute value of wheel deceleration or acceleration, the on-period for solenoid S2-7 will be correspondingly prolonged so as to correspondingly hasten the brake pressure modifying speed. On the other hand, when the absolute value of wheel acceleration becomes smaller, the off-period of the solenoid S2-7 is correspondingly retarded, said solenoid S2-7 being assumed to be same as that shown at S2 in FIG. 7. On-off operation of the solenoid S2, FIG. 7, occuring in the above-mentioned way, will lead to the corresponding on-off operation of the valve unit (B') at a certain high operational frequency such as 15 – 30 c/s so as to invite a corresponding pressure variation depending upon the absolute value of the wheel deceleration or acceleration.

Figure 22:
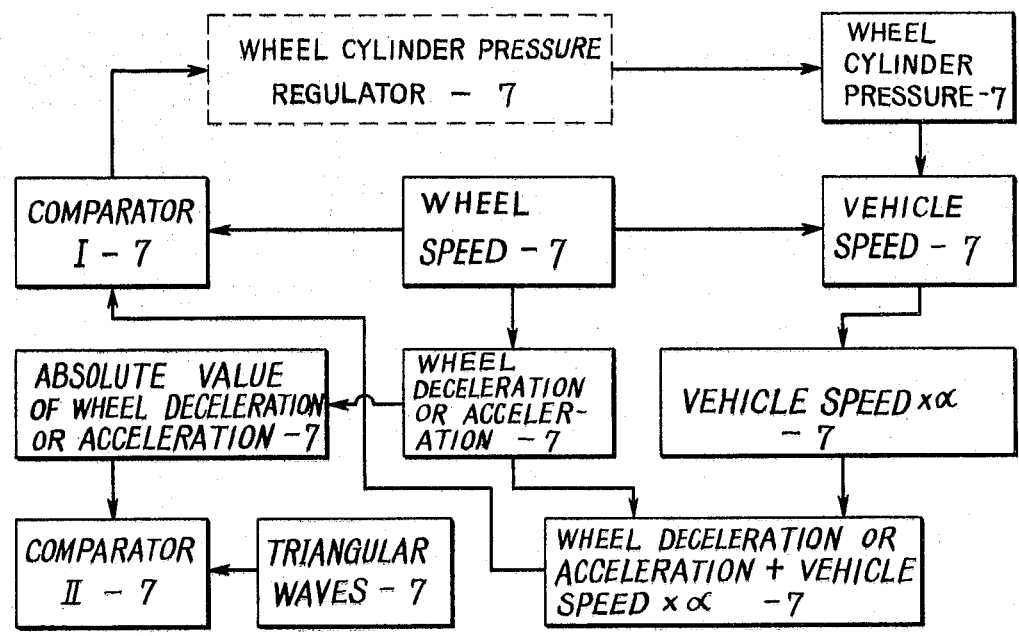
FIG. 22 is a block diagram showing the seventh embodiment in a highly simplified way.

The aforementioned seventh embodiment is shown in a highly simplified block diagram in FIG. 22.

Now referring to FIG. 22, the relationship: 0.5<alpha <0.9 is maintained, as was referred to hereinbefore.

When assuming that in the present embodiment T', U' and V' denote the corresponding values to those denoted X, Y and Z in the foregoing fourth embodiment, the following operational modes are realized:

In the first comparator I-7, when T' is larger than V', the wheel cylinder pressure will be subjected to a pressure recovery step. On the contrary, when T' is smaller than V', the wheel cylinder pressure will be subjected to a pressure reducing step.

In the second comparator II-7, when U' is larger than W', the wheel cylinder pressure modifying step is carried out at a rather quicker speed. On the other hand, when, in the second comparator II-7, U' is smaller than W', the pressure-modifying operations are correspondingly retarded. From the foregoing, it may be easily understood that the hydraulic brake pressure-modifying operations are performed at a speed substantially in relation with the value of U'.

Under normal travelling condition of the vehicle without application of any brake, the vehicle speed is nearly equal to the wheel speed, and the wheel deceleration or acceleration is nearly equal to nil, thus T'(wheel speed-responsive signal) is larger than V'(signal responsive to "wheel deceleration or acceleration plus vehicle speed multiplied by alpha"), so that the first comparator I-7 will be adapted for performing a brake pressure-restoring state, hich means that the brake system is kept in its off-service position.

When the hydraulic brake is applied at this stage, the wheel speed will become smaller than the vehicle speed so that a wheel speed deceleration occurs.

Upon application of a sudden and substantial brake to such a degree that a wheel lock is thereby about to be invited, the relationship: "T' being larger than V''" will turn to the opposite relationship: "T' being smaller than V'. " Thus, the first comparator I-7 will operate so as to provide a brake pressure reducing step. With larger wheel speed deceleration degree realized in this case, the opposite relationship above referred to is realized at a sooner time point, so as to provide a favorable tendency for reducing the same as those of the foregoing embodiments, especially the sixth one.

Next, the operation of the eighth embodiment will be described in detail.

In the first block, a wheel speed-responsive signal voltage is produced and smoothed out as before.

In the second block II-8, a wheel deceleration or acceleration-responsive signal voltage is produced as before.

In the third block III-8, a vehicle speed-responsive signal voltage is charged in the condenser C3-8, as before.

In the fourth block IV-8, a voltage output corresponding to the ratio of the resistance value at M2-8/that appearing at M1-8 is obtained.

In the fifth block V-8, a signal voltage responsive to (alpha plus wheel speed deceleration or acceleration) will be obtained as before. For wheel deceleration, (alpha plus wheel deceleration) is larger than alpha, and vice versa.

In the sixth block VI-8, the emitter potential at transistor T3-8 corresponds to the voltage responsive to the ratio:wheel speed/vehicle speed, while the base potential at transistor T3-8 corresponds to the voltage responsive to (alpha plus wheel speed deceleration or acceleration) as produced in the foregoing fifth block V-8.

When the voltage responsive to the ratio: wheel speed/vehicle speed is larger than the voltage responsive to (alpha plus wheel deceleration or acceleration), transistors T3-8, T4-8 and T5-8 will become non-conductive so that no current is allowed to flow through the solenoid S1-8, and vice versa.

When the voltage responsive to the ratio of wheel speed/vehicle speed is larger than the voltage responsive to the sum of (alpha plus wheel deceleration or acceleration), the transistors T3-8, T4-8 and T5-8 will become non-conductive so that no current is allowed to flow through the solenoid S1-8, and vice versa.

In the seventh block VII-8, resistors R18-8 and R19-8 and transistors T6-8 and T7-8 constitute in combination a first differential amplifier, and in the similar way, resistors R20-8 and R21-8 and transistors T8-8 and T9-8 constitute in combination a second differential transistor. The base potential for transistors T6-8 and T9-8 is provided by the voltage fed from the block IV-8 responsive to the ratio of wheel speed/vehicle speed. The base potential for transistors T7-8 and T8-8 is provided by the voltage supplied from the block V-8 responsive to the sum of alpha plus wheel deceleration or acceleration. At the anodic side of each of the diodes D2-8 and D3-8, either lower one of the collector potentials at T6-8 and T8-8. In this way, a voltage responsive to |wheel speed/vehicle speed minus (alpha plus wheel deceleration or acceleration)| is obtained.

In the eighth block VIII-8, the triangular pulse series developed at condenser C6-8 is processed at transistors T10-8 and T11-8 for being subjected to current amplification and thus, an amplifier triangular pulse series will appear at the collector electrode of transistor T11-8, the frequency of the pulse series being preferably set to about 15 – 30 c/s.

Figure 23A:
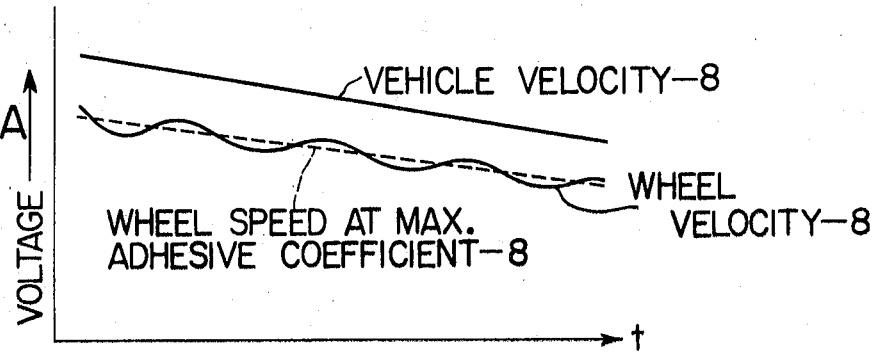
FIGS. 23A–23C are a combined chart for the illustration of the operating performance of the eighth embodiment shown in FIG. 20.
Figure 23B:
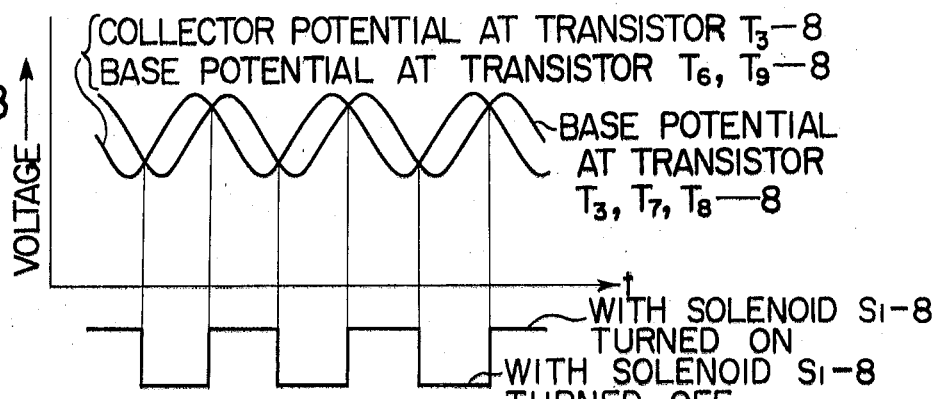
Figure 23C:
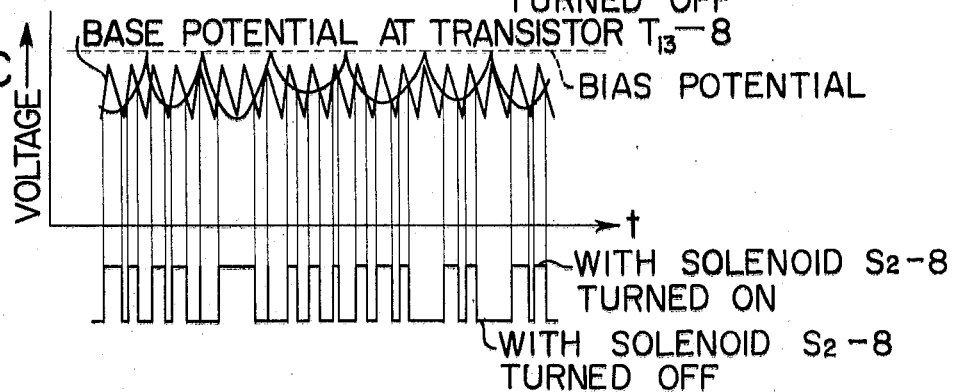

In the nineth block IX, when the base potential at T12-8 is higher than that appearing at T13-8, the transistor T14-8 will become non-conductive so that no current is allowed to pass through the solenoid S2-8, and vice versa. This relationship is illustrated diagrammatically in FIGS. 23A–23C.

With larger value of the term: |wheel speed/vehicle speed − (alpha plus wheel deceleration or acceleration)|, the on-period of the solenoid S2-8 becomes correspondingly longer so that the brake pressure-modifying step is made rather quicker, and vice versa. In this way and by use of a proper valve unit such as shown in FIG. 12, the hydraulic pressure-modifying steps may be performed, when necessary, at a rather high repetition cycle such as at about 15 − 30 c/s, and additionally, the on-off period of the valve unit may be varied in the similar way as set forth in connection with the foregoing seventh embodiment, a hydraulic pressure modifying speed which is substantially responsive to the term: |wheel speed/vehicle speed minus (alpha plus wheel deceleration or acceleration)| can be provided.

Figure 24:
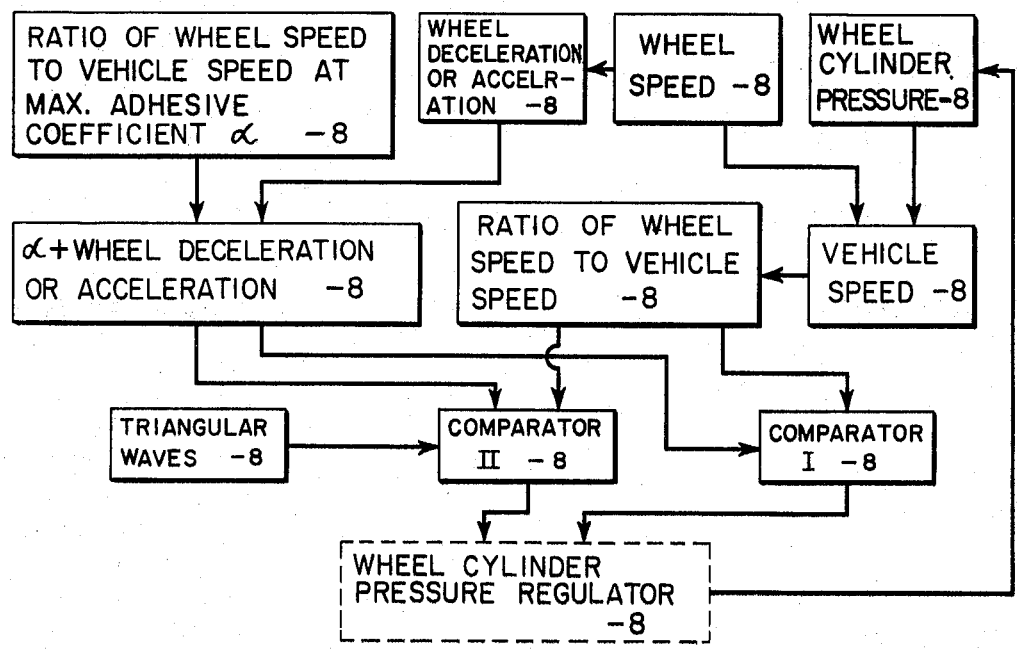
FIG. 24 is a block diagram of the eighth embodiment in a highly simplified manner.

The eighth embodiment so far shown and described is shown in a highly simplified block diagram shown in FIG. 24.

In this case, also, the relationship: 0.5 <alpha< 0.9 is maintained.

When T' is larger than U' in the first comparator I-8, the hydraulic brake pressure is subjected to a pressure-restoring step. On the contrary, when T' is smaller than U', the brake pressure is subjected to a pressure-reducing step.

When |T' − U'| is larger than V' in the second comparator, the pressure-modifying step will be performed rather quicker, and vice versa.

Further operational steps are similar to those which have been set forth in the foregoing seventh embodiment.

Figure 25:
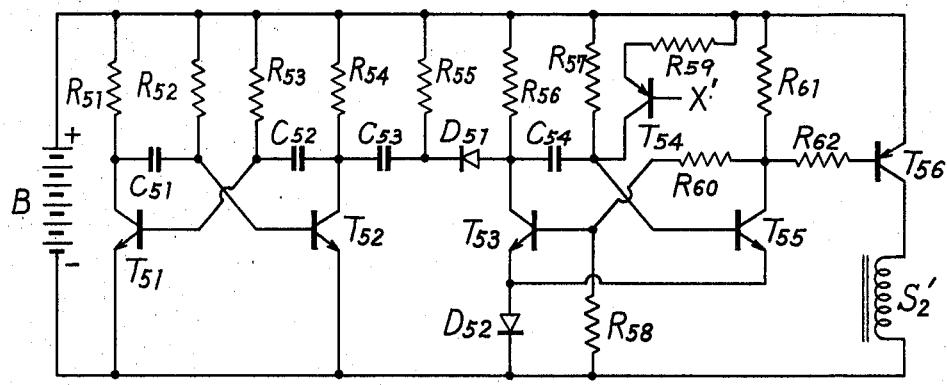
FIG. 25 is a connection diagram of a modified arrangement of blocks VII-7 and VIII-7 in the foregoing seventh embodiment or of blocks VIII-8 and IX-8 in the foregoing eighth embodiment.

Next, referring to FIG. 25, a final or nineth embodiment will be described in detail hereinafter.

In this embodiment, an astable multivibrator is composed of resistors R51 to R54, condensers C51 and C52, transistors T51 and T52. On the other hand, a monostable multivibrator is composed of resistors R55 to R61 except R57, transistors T53 to T55, condenser C54, and diode D52. Combination of condenser C53, resistor R55 and diode D51 is designed and arranged to provide trigger signal by which control action is provided from said astable multivibrator to said monostable multivibrator. On the other hand, combination of resistor R62 and transistor T56 serve for performing on-off operation of solenoid S'2 depending upon the collector potential at transistor T55.

The base potentials of transistor T54 correspond to X-7 in the seventh embodiment and X-8 in the eighth embodiment, respectively, which further correspond to absolute value of wheel deceleration or acceleration, and the value of |wheel speed/vehicle speed minus ( α + wheel deceleration or acceleration)| , increase of which value lowers the base potential of transistor T54.

From the foregoing circuit arrangement, it is so designed and arranged that there is produced pulse signal having a predetermined frequency such as 15 - 30 c/s at the collector potential of transistor T52. This pulse signal is differentiated by condenser C53 and resistor R55 so as to provide the collector potential of transistor T53 through diode D51. Namely, the collector of transistor T53 is applied with trigger voltage once as per one frequency of the collector potential of transistor T52. Transistor T55 is kept to be conductive, but becomes non-conductive for a predetermined period of time, when the collector of transistor T53 is applied with trigger voltage. The above-mentioned period of time for non-conductive state is determined by the equivalent resistance at transistor '54, condenser C54, resistors R57 and R59.

Therefore, when the absolute value of wheel deceleration or acceleration is large, or |wheel speed/vehicle speed minus (alpha + wheel deceleration or acceleration)| has a large value, the base potential of transistor T54 becomes low, the time for non-conductive state of transistor T55 is shortened. Conversely, when the above-mentioned value is small, the base potential of transistor T54 is hightened, and the equivalent resistance of transistor T54 becomes large, thus prolonging the time for non-conductive state of transistor T55. The collector potential of transistor T55 is rendered as the base potential of transistor T56 via resistor R62. When transistor T55 is in its non-conductive state, transistor T56 becomes also non-conductive so as to turn off solenoid S'2. Conversely, when transistor T55 is conductive, transistor T56 becomes conductive so as to turn on solenoid S'2.

These operational steps are shown diagrammatically in FIGS. 26A–26E.

This solenoid S'2 is arranged to cooperate with hydraulic pressure regulator unit as shown hereinbefore. In this way, the on-off control of solenoid S'2 can be performed at a certain high frequency such as 15 – 30 c/s.

1. An antiskid brake control method, comprising the following steps:
   a. sensing a vehicle wheel speed and generating a wheel speed signal in accordance therewith;
   b. generating a wheel deceleration or acceleration signal as a function of said wheel speed signal;
   c. sensing the vehicle speed and generating a vehicle speed signal in accordance therewith;
   d. generating a control signal as a function of the comparison of said wheel speed signal and said vehicle speed signal when said function exceeds a predetermined slip ratio, modified by said wheel deceleration or acceleration signal, including establishing a reference signal related to a maximum coefficient of adhesion between the wheel and a traffic surface along which said wheel travels, said reference signal being related to the ratio of said wheel speed signal to said vehicle speed signal, establishing a first signal related to said wheel speed signal, and comparing said first signal with said reference signal and said wheel deceleration or acceleration signal to provide said brake pressure control signal;
   e. controlling said brake pressure in accordance with said control signal whereby the time lag in the reduction or restoration of said brake pressure is eliminated.

2. The method of claim 1, including adding said wheel deceleration or acceleration signal to said reference signal.

3. The method of claim 2 wherein said reference signal is obtained by modifying said vehicle speed signal to a value of wheel speed signal corresponding to a maximum coefficient of adhesion between the wheel and a traffic surface along which the wheel is travelling, and wherein said first signal is the vehicle wheel speed.

4. The method of claim 2, wherein said reference signal is a ratio between the vehicle speed and the wheel speed corresponding to a maximum coefficient of adhesion between the wheel and a traffic surface along which the wheel is travelling and wherein said first signal is a value corresponding to a ratio of said vehicle speed signal to said wheel speed signal.

5. The method of claim 2, further comprising a step for increasing the hydraulic brake pressure reduction or restoration rate when the variation in the wheel speed is larger than a predetermined value.

6. The method of claim 5, wherein said variation in said wheel speed to be compared with said predetermined value is sensed from the absolute value of said wheel deceleration signal.

7. The method of claim 5, wherein said variation in said wheel speed to be compared with said predetermined value is sensed from the absolute value of (wheel speed signal divided by vehicle speed signal) minus (reference signal) plus (wheel deceleration or acceleration signal).

8. The method of claim 5, wherein said predetermined value is modified at a high frequency such that the braking pressure reduction or restoration period is variable and the braking pressure reduction and restoration is substantially stepless.

9. The method of claim 8, wherein the variation in said wheel speed to be compared with said high frequency is sensed from the absolute value of (wheel speed signal divided by vehicle speed signal) minus (reference signal) plus (wheel deceleration or acceleration signal).

10. The method of claim 8, wherein said variation in said wheel speed to be compared with said high frequency is sensed from the absolute value of said wheel deceleration or acceleration.

11. An antiskid brake control apparatus comprising:
   a. first circuit means for detecting a wheel speed from a generator which delivers a voltage responsive to the rotational speed of a vehicle wheel and for producing an output indicative of the wheel speed;
   b. second circuit means for generating a vehicle wheel deceleration or acceleration signal from the wheel speed signal;
   c. third circuit means for generating a vehicle speed signal by modifying the output signal from said first circuit means with the hydraulic pressure in a wheel cylinder attached to said vehicle wheel;
   d. fourth circuit means for generating a reference signal related to the maximum coefficient of adhesion between the wheel and the traffic surface along which said wheel travels said reference signal being related to the ratio of said wheel speed signal relative to said vehicle speed signal;
   e. fifth circuit means for adding said wheel deceleration or acceleration signal to said reference signal; and
   f. sixth circuit means for comparing the output signal from said fifth circuit with a signal related to said wheel speed signal thereby determining the direction of brake pressure control.

12. The apparatus of claim 11, wherein said third circuit means comprises a charging circuit means for charging in response to the output signal from said first circuit means; means for sensing the hydraulic pressure in said vehicle wheel cylinder; and a discharge circuit means for discharging said charging means in accordance with the hydraulic pressure.

13. The apparatus of claim 11, wherein said fourth circuit means comprises a voltage divider circuit for dividing the vehicle speed into a value corresponding to a wheel speed signal representing a maximum coefficient of adhesion, and wherein said sixth circuit means compares the output of said fifth circuit means with the wheel speed signal.

14. The apparatus of claim 13, comprising eighth circuit means for comparing the absolute value of said wheel deceleration or acceleration signal with said reference signal and for reducing or restoring the hydraulic brake pressure in two stages in accordance with said comparison.

15. The apparatus of claim 14, wherein said eight circuit means comprises a solenoid means for speeding-up the hydraulic brake pressure reduction or restoration, upon being energized in response to the wheel deceleration or acceleration being larger than said reference signal.

16. The apparatus of claim 13, comprising ninth circuit means for generating a series of triangular signal waves; and tenth circuit means for comparing the absolute value of said wheel deceleration or acceleration signal with the output signal from said ninth circuit means such that the rate of hydraulic brake pressure decrease or increase is varied by said sixth circuit means.

17. The apparatus of claim 16, wherein said tenth circuit means comprises a solenoid energized when the absolute value of said wheel speed deceleration or acceleration signal is less than the output signal from said ninth circuit means whereby the rate of hydraulic braking pressure decrease or increase is increased.

18. The apparatus of claim 13, further including a valve drive circuit comprising an astable multivibrator for generating a series of pulse signals of a certain predetermined cycle; and a monostable multivibrator controlled by said wheel deceleration or acceleration signal, wherein the rate of the hydraulic brake pressure decrease or increase is variable.

19. The apparatus of claim 11, further comprising seventh circuit means for providing a signal corresponding to the ratio of said vehicle speed signal to said wheel speed signal wherein said reference signal corresponds to a specific ratio of said vehicle speed signal to said wheel speed signal for a maximum coefficient of adhesion, and wherein said sixth circuit means compares the output of said fifth circuit means and said seventh circuit means.

20. The apparatus of claim 19, wherein said seventh circuit means comprises a first magnetic resistor means, the resistance of which is variable with variation in the intensity of a first solenoid energizable in response to the output signal from said third circuit means; a second magnetic resistor means, the resistance of which is variable with variation in the intensity of a magnetic field of a second solenoid energizable in response to the output signal from said first circuit means; and an amplifier means for producing a signal corresponding to a ratio of the resistance value of said second magnetic resistor means to that of said first magnetic resistor means.

21. The apparatus of claim 19, further comprising eighth circuit means for comparing the absolute value of the output of said seventh circuit means minus the output of said fifth circuit means to said reference signal, whereby the reduction or restoration of the hydraulic brake pressure occurs in two stages wherein the reduction or restoration is determined by the output of said sixth circuit means.

22. The apparatus of claim 21, wherein said eighth circuit means comprises a solenoid means energized when the absolute value of the difference between the output of said seventh circuit means minus the output of said fifth circuit means is larger than said reference signal whereby the rate of the hydraulic braking pressure decrease or increase is correspondingly changed.

23. The apparatus of claim 19, comprising ninth circuit means for generating a series of triangular signal waves; and tenth circuit means for comparing the absolute value of the output signal of said seventh circuit means, minus the output signal of said fifth circuit means with said reference signal whereby the rate of the hydraulic braking pressure increases or decreases in accordance with the output of said sixth circuit means.

24. The apparatus of claim 19, further including a valve drive circuit comprising an astable multivibrator for generation of regular pulses of a certain constant cycle; and a monostable multivibrator controlled by the absolute value of the output signal from said seventh circuit means minus the output signal from said fifth circuit means and the output of said astable multivibrator, whereby the hydraulic brake pressure increase or decrease rate is made variable.

25. The apparatus of claim 11, wherein said sixth circuit means comprises a solenoid energized when the output signal of said fifth circuit means is larger than the signal related to said wheel speed signal, the hydraulic brake pressure decreasing when said solenoid is energized.

* * * * *